(12) United States Patent
Kyono et al.

(10) Patent No.: US 12,449,810 B2
(45) Date of Patent: Oct. 21, 2025

(54) AUTONOMOUS MANEUVER GENERATION TO MATE CONNECTORS

(71) Applicant: THE BOEING COMPANY, Chicago, IL (US)

(72) Inventors: Trent M. Kyono, Wailuku, HI (US); Jacob Arthur Lucas, Makawao, HI (US); Nicole Catherine Gagnier, Kihei, HI (US); Justin Cleve Hatcher, Sumner, WA (US); Yifan Yang, Kirkland, WA (US); James Lee Clayton, Everett, WA (US); Paul S. Idell, Thousand Oaks, CA (US)

(73) Assignee: THE BOEING COMPANY, Arlington, VA (US)

( * ) Notice: Subject to any disclaimer, the term of this patent is extended or adjusted under 35 U.S.C. 154(b) by 633 days.

(21) Appl. No.: 17/651,323

(22) Filed: Feb. 16, 2022

(65) Prior Publication Data
US 2022/0276652 A1 Sep. 1, 2022

Related U.S. Application Data

(60) Provisional application No. 63/155,052, filed on Mar. 1, 2021.

(51) Int. Cl.
| | | |
|---|---|---|
| *G06T 7/11* | (2017.01) | |
| *B64D 39/02* | (2006.01) | |
| *B64D 39/06* | (2006.01) | |
| *B64D 47/08* | (2006.01) | |
| *B64G 1/64* | (2006.01) | |
| *B64G 1/66* | (2006.01) | |
| *G05D 1/00* | (2006.01) | |

(Continued)

(52) U.S. Cl.
CPC ........... *G05D 1/0094* (2013.01); *B64D 39/02* (2013.01); *B64D 39/06* (2013.01); *B64D 47/08* (2013.01);

(Continued)

(58) Field of Classification Search
CPC ........ G05D 1/0094; G05D 1/101; G06T 7/11; G06T 3/40; G06T 2207/30252;
(Continued)

(56) References Cited

U.S. PATENT DOCUMENTS

| | | |
|---|---|---|
| 5,530,650 A | 6/1996 | Biferno et al. |
| 8,994,723 B2 | 3/2015 | Drost et al. |

(Continued)

FOREIGN PATENT DOCUMENTS

CN 111942621 A * 11/2020 ............. B25J 11/00

OTHER PUBLICATIONS

"The 21st century benchmark for new generation tanker/transport aircraft," Services, Airbus.com/defence/a330mrtt.html; A330 MRTT; p. 1-27.

(Continued)

*Primary Examiner* — Vivek D Koppikar
*Assistant Examiner* — Jeffrey R Chalhoub
(74) *Attorney, Agent, or Firm* — Moore IP Law

(57) ABSTRACT

A method includes providing an image to a feature extraction model to generate feature data. The image depicts a portion of a first device and a portion of a second device. The feature data includes coordinates representing key points of each of the first and second devices depicted in the image. The method also includes obtaining position data indicating a position in 3D space of a connector of the first device. The method further includes providing the feature data and the position data to a trained autonomous agent to generate a proposed maneuver to mate the connector with a connector of the second device.

8 Claims, 11 Drawing Sheets

(51) Int. Cl.
*G06T 3/40* (2006.01)
*G06V 10/40* (2022.01)

(52) U.S. Cl.
CPC .............. *B64G 1/6462* (2023.08); *B64G 1/66* (2013.01); *G05D 1/101* (2013.01); *G06T 3/40* (2013.01); *G06T 7/11* (2017.01); *G06V 10/40* (2022.01); *G06T 2207/30252* (2013.01)

(58) Field of Classification Search
CPC ........ G06V 10/40; B64D 39/02; B64D 39/06; B64D 47/08; B64G 1/646; B64G 1/66
See application file for complete search history.

(56) References Cited

U.S. PATENT DOCUMENTS

| | | | | |
|---|---|---|---|---|
| 2008/0302916 A1* | 12/2008 | Speer | .................... | B64D 39/00 244/135 A |
| 2014/0105506 A1* | 4/2014 | Drost | .................... | G06V 20/64 382/199 |
| 2014/0353430 A1* | 12/2014 | Rix | ........................ | B64D 39/06 244/135 A |
| 2019/0220993 A1 | 7/2019 | Li et al. | | |

OTHER PUBLICATIONS

Ronneberger, Olaf et al., "U-Net: convolutional Networks for Biomedical Image Segmentation," Computer Science Department and BIOSS Centre for Biological Signaling Studies, University of Freiburg, Germany May 18, 2015, arXiv:1505.04597v1 [cs.CV]; http://lmb.informatik.uni-freiburg.de/, pp. 1-8.

Extended European Search Report and Written Opinion for Application No. 22158020.2 dated Jul. 20, 2022, pp. 1-8.

Grosgeorge, Damien et al., "Concurrent Segmentation and Object Detection CNNs for Aircraft Detection and Identification in Satellite Images," ARXIV.org, Cornell University Library, 201 Oling Library Cornell University Itaca, NY May 27, 2020, pp. 1-4.

Communication pursuant to Article 94(3) EPC for application No. 22158020.2, dated May 13, 2024, pp. 1-8.

* cited by examiner

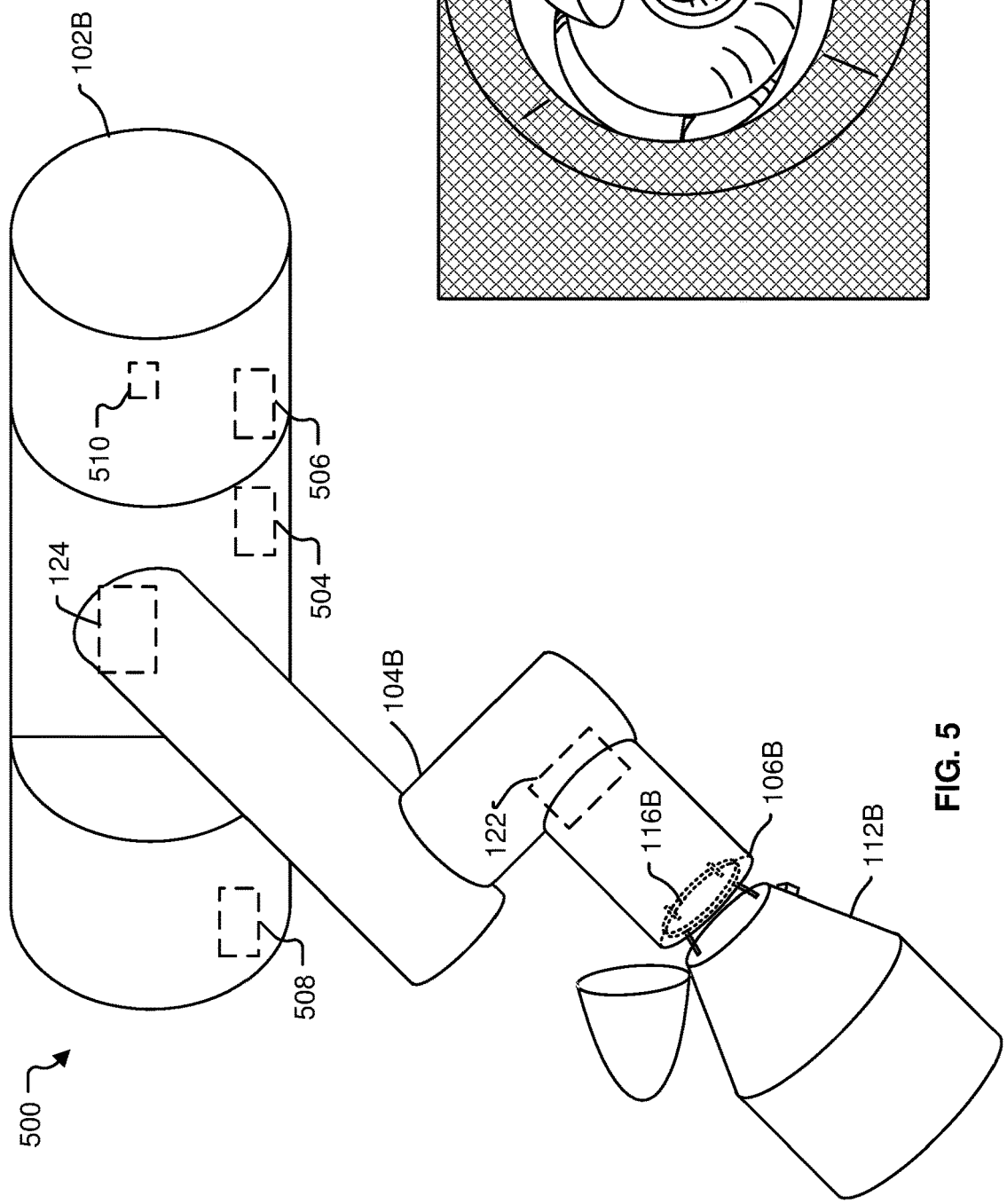

AUTONOMOUS MANEUVER GENERATION TO MATE CONNECTORS

CROSS-REFERENCE TO RELATED APPLICATIONS

This application claims the benefit of U.S. Patent Application No. 63/155,052 entitled "AUTONOMOUS MANEUVER GENERATION TO MATE CONNECTORS," filed Mar. 1, 2021, the contents of which are incorporated by reference in their entirety.

FIELD OF THE DISCLOSURE

The present disclosure is generally related to autonomous maneuver generation to mate connectors.

BACKGROUND

Highly skilled human operators are typically used to guide complex, high-speed docking operations, such as air-to-air refueling and spacecraft docking operations. As such, the operations rely heavily on human judgment, which is sometimes supplemented by computer vision techniques. To illustrate, complex stereoscopic vision systems may be used to aid the human operator in mating connectors (e.g., a receiver and refueling boom or docking connectors).

SUMMARY

In a particular aspect, a method includes providing a first image as input to a feature extraction model to generate feature data. The first image depicts a first portion of a first device and a second portion of a second device. The feature data includes first coordinates representing key points of the first device depicted in the first image and includes second coordinates representing key points of the second device depicted in the first image. The method also includes obtaining, from one or more sensors onboard the first device, position data indicating a position in three-dimensional space of a first connector of the first device. The first connector is disposed on the first portion of the first device. The method further includes providing the feature data and the position data as input to a trained autonomous agent to generate a proposed maneuver to mate the first connector with a second connector of the second device.

In another particular aspect, a device includes a moveable coupling system configured to move a first connector relative to a second connector of a second device. The device also includes one or more sensors configured to generate position data indicating a position in three-dimensional space of the first connector. The device further includes a camera configured to generate image data depicting a portion of the moveable coupling system and at least a portion of the second device. The device also includes a feature extraction model configured to receive a first image based on the image data and to generate feature data based on the first image. The feature data includes first coordinates representing key points of the moveable coupling system depicted in the first image and includes second coordinates representing key points of the second device depicted in the first image. The device further includes a trained autonomous agent configured to generate, based on the feature data and the position data, a proposed maneuver to mate the first connector with a second connector of the second device.

In another particular aspect, a tanker aircraft includes a steerable boom including a first connector configured to couple to a second connector of a second aircraft during refueling of the second aircraft. The tanker aircraft also includes one or more sensors coupled to the steerable boom and configured to generate position data indicating a position of the steerable boom in three-dimensional space. The tanker aircraft further includes a camera configured to generate image data depicting a portion of the steerable boom and at least a portion of the second aircraft. The tanker aircraft also includes a feature extraction model configured to receive a first image based on the image data and to generate feature data based on the first image. The feature data includes first coordinates representing key points of the steerable boom depicted in the first image and includes second coordinates representing key points of the second aircraft depicted in the first image. The tanker aircraft further includes a trained autonomous agent configured to generate, based on the feature data and the position data, a proposed maneuver to mate the first connector with the second connector.

In another particular aspect, a spacecraft includes a steerable docking mechanism including a first connector configured to couple to a second connector of a second spacecraft during a docking operation. The spacecraft also includes one or more sensors coupled to the steerable docking mechanism and configured to generate position data indicating a position of the steerable docking mechanism in three-dimensional space. The spacecraft further includes a camera configured to generate image data depicting a portion of the steerable docking mechanism and at least a portion of the second spacecraft. The spacecraft also includes a feature extraction model configured to receive a first image based on the image data and to generate feature data based on the first image. The feature data includes first coordinates representing key points of the steerable docking mechanism depicted in the first image and includes second coordinates representing key points of the second spacecraft depicted in the first image. The spacecraft also includes a trained autonomous agent configured to generate, based on the feature data and the position data, a proposed maneuver to mate the first connector with the second connector.

The features, functions, and advantages described herein can be achieved independently in various implementations or may be combined in yet other implementations, further details of which can be found with reference to the following description and drawings.

BRIEF DESCRIPTION OF THE DRAWINGS

FIG. 5 is a diagram that illustrates a system configured to generate a proposed maneuver to mate a first connector with a second connector based on image data and position data.

FIG. 6 is a diagram that illustrates an example of a display generated by the system of FIG. 5.

DETAILED DESCRIPTION

Figure 1:
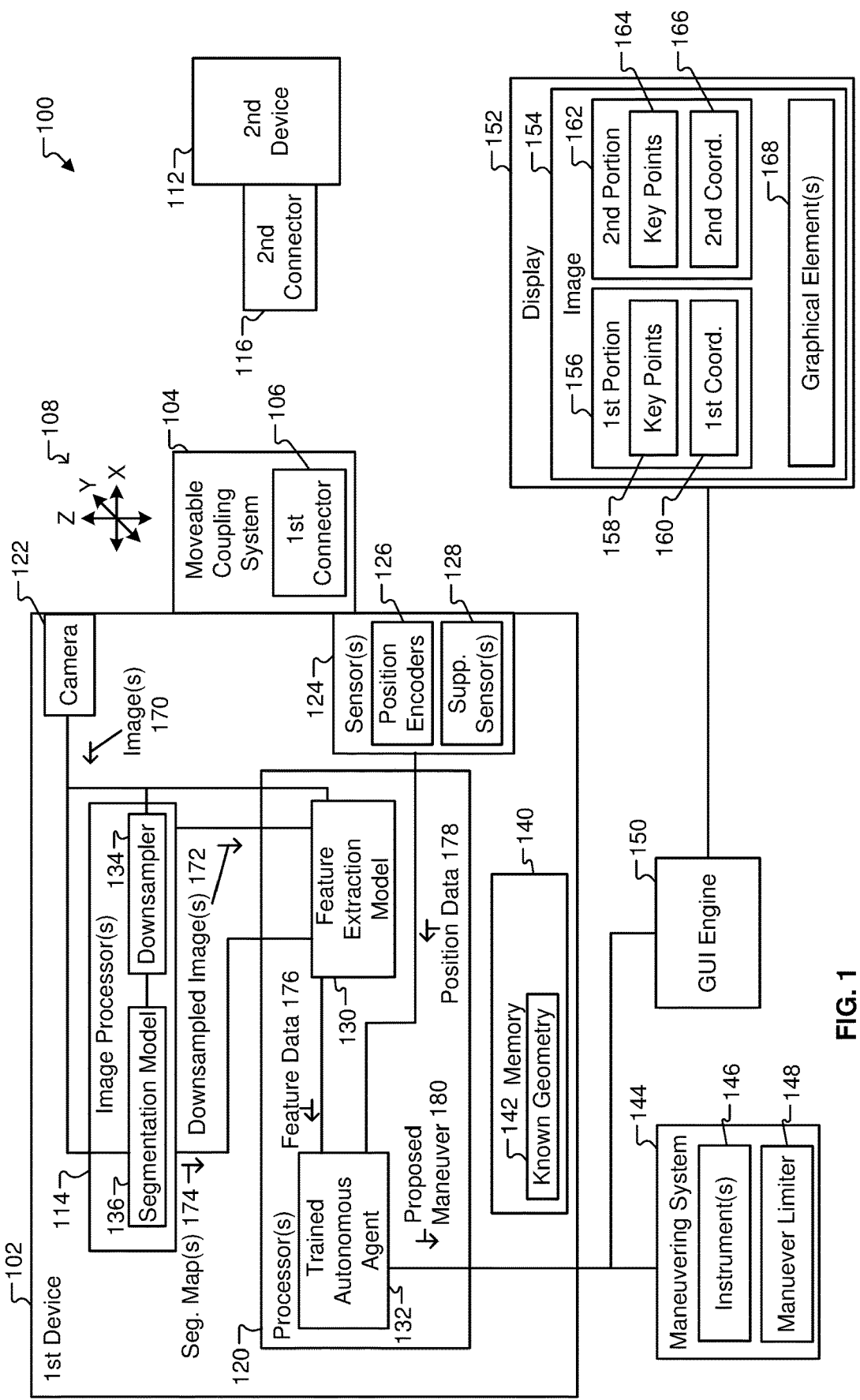
FIG. 1 is a diagram that illustrates a system configured to generate a proposed maneuver to mate a first connector with a second connector based on image data and position data.

Aspects disclosed herein present systems and methods that use a trained autonomous agent to generate proposed maneuvers for mating connectors of two different devices. For example, the autonomous agent may include one or more neural networks or other machine-learning models that are trained to generate maneuvering recommendations or commands to guide a refueling connector to a refueling port of an aircraft during air-to-air refueling operations. As another example, the autonomous agent may be trained to generate maneuvering recommendations or commands to guide docking of one spacecraft to another spacecraft. In some implementations, the trained autonomous agent may be used to assist a human operator to improve reliability and to standardize operations during maneuvering to mate connectors. In other implementations, the trained autonomous agent may be used instead of a human operator to reduce costs, such as costs associated with training human operators and costs associated with operations to mate connectors.

In some contexts, the two devices performing docking include a primary device and a secondary device. Although the terms may be arbitrarily assigned in some contexts (such as where two peer devices are docking), generally, the primary device refers to a device that is servicing the secondary device, or the primary device refers to the device, onboard which the trained autonomous agent resides. To illustrate, in an air-to-air refueling context, the primary device is the tanker aircraft. Likewise, the secondary device refers to the other device of a pair of devices. To illustrate, in the air-to-air refueling context, the secondary device is the receiving aircraft (e.g., the aircraft that is to be refueled). Further, the term device is used broadly to include an object, system, or assembly of components that is/are operated upon as a unit (e.g., in the case of the secondary device) or that operate cooperatively to achieve a task (e.g., in the case of the primary device).

In a particular aspect, a system uses a camera (e.g., a single camera) to capture monocular video of at least a portion of each of the devices that are undergoing docking operations. For example, the camera may capture images of a portion of a refueling boom and of a receiving aircraft. As another example, the camera may capture images of a portion of docking ports of two spacecraft. The autonomous agent is trained to output a real-time directional indicator of a maneuver to position couplers of the devices undergoing docking. This directional indicator can be output in a manner that can be interpreted and executed by either a human operator or an automated system. In some implementations, the autonomous agent is also, or alternatively, trained to limit maneuvers that can be performed to reduce the likelihood of unintended contact between the devices.

To illustrate, one form of aerial refueling uses a complex targeting operation combined with a controlled docking of a boom from the tanker aircraft to a receptacle on the receiving aircraft. During this operation, an operator interprets images from a camera and guides the boom to dock with the receptacle on the receiving aircraft while both aircraft are in motion. The operator controls the relative angle of the boom as well as the deployed length of the boom. The operation can be complicated due to relative motion of the aircraft, poor visibility, poor lighting conditions, etc. Additional complications can arise when the operator controls the boom in three-dimensional (3D) space based on two-dimensional (2D) information from one or more cameras. For example, interpreting the 2D information from the images complicates the operator's depth perception, the operator's ability to predict boom contact point with receiver, and the operator's evaluation and response to boom jitter due to turbulence. Inaccurate interpretation of the 2D information can result in unsuccessful refueling since the receiving aircraft or the boom may be damaged if the boom contacts portions of the receiving aircraft other than the receptacle. The same or similar challenges are present when two spacecraft are docking.

In a particular aspect disclosed herein, machine learning is used to train an autonomous agent to replace or augment a human operator. For example, the autonomous agent may process available information in a manner that enables precisely locating two devices in 3D space based on 2D image data and sensor data (e.g., position encoder data). As another example, the autonomous agent may determine an optimal policy (under particular circumstances) to mate connectors of the two devices.

In a particular implementation, a U-Net convolutional neural network (CNN) is trained as a feature extractor to map an image of a target to a binary mask (or masks) with the locations of the features denoted by a Gaussian distribution centered on the features. In this implementation, reliability of feature detection is improved by training the feature extractor using images with different levels of detail. For example, an original or source image may be downsampled one or more times to generate one or more downsampled images, and the feature extractor may be trained using the source image and the one or more downsampled images. Training the feature extractor using multiple images with different levels of detail reduces the chance that the feature detector is detecting specific details of features rather than the general attributes, which in turn, improves reliability of the feature detector. To illustrate, the feature extractor is able to detect general attributes even when specific detailed features are obscured.

Downsampling the image removes or reduces higher frequency content representing feature details, which encourages the feature extractor to learn more general features, such as general shapes and geometry. The U-net CNN architecture enables generating feature data at various levels of downsampling and merging the feature data to form feature data output. Forming merged feature data in this manner improves reliability (due the use of low resolution images) while retaining accuracy (due the use of high resolution images). A feature extractor can be trained in this manner to have a lower error rate, by orders of magnitude, than a feature extractor that uses a single image resolution.

The feature data generated by the feature extractor identifies coordinates of key points of the devices in an image. In a particular aspect, an imputation network is trained, based on known geometry of the devices, to recognize and repair outliers in the feature data. For example, the imputation network may compare known geometries of a refueling boom and a particular receiving aircraft to the key points and remove or reposition erroneous key points. In some aspects, a Kalman filter is used to temporally filter the images and/or feature data to further improve accuracy. In some implementations, in addition to image data, the feature extractor may generate the feature data using supplemental sensor data, such as data from one or more of a lidar system, a radar system, etc.

In a particular aspect, the feature data is provided as input to the trained autonomous agent. In some aspects, the trained autonomous agent also receives as input position data indicating a position in 3D space of a first connector of the primary device (e.g., the fueling coupler of the boom in an air-to-air refueling use case). The trained autonomous agent is configured to generate a recommended maneuver based on the feature data and the position data. The recommended maneuver indicates a motion of the connector of the primary device to connect to the connector of the secondary device.

In a particular aspect, the autonomous agent is trained using reinforcement learning techniques. For example, in reinforcement learning, a reward is determined based on how well the autonomous agent performs a desired action. Additionally, or in the alternative, a penalty is determined based on how poorly the autonomous agent performs the desired action. In a particular aspect, the reinforcement learning is used to train the autonomous agent to determine an optimum maneuver, such as a shortest or least cost maneuver to mate the connectors. In another particular aspect, the reinforcement learning is used to train the autonomous agent to mimic one or more highly skilled human operators. Rewards may be applied if the autonomous agent successfully mates connectors of the two devices without the connector of the primary device contacting any surface of the secondary device except the connector of the secondary device. Additionally, or in the alternative, a penalty may be applied if the autonomous agent causes any undesired contact between portions of the primary and secondary devices.

One benefit of the disclosed systems and methods is that machine learning based docking processes can be parallelized for execution on one or more graphical processing units (GPU) to operate more quickly than computer vision techniques that rely on pattern matching. For example, pattern matching techniques generally operate at about one frame every few seconds, whereas the disclosed techniques can operate in excess of 20 frames per second. Additionally, the autonomous agent is capable of mimicking a human operator by learning patterns used by highly skilled human operators for mating connectors of the devices and can improve on these patterns to eliminate suboptimal actions or to combine the best maneuvers of multiple different skilled operators.

The figures and the following description illustrate specific exemplary aspects. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, illustrates an example that is generic to any primary device (e.g., first device 102) and any secondary device (e.g., second device 112), whereas FIGS. 2, 3, 5, and 6 illustrate specific examples of the primary device (e.g., tanker aircraft 102A or first spacecraft 102B) and specific examples of the secondary device (e.g., receiving aircraft 112A or second spacecraft 112B). When referring to a particular one of the specific examples, such as the example illustrated in FIG. 2, the primary device is referred to as the tanker aircraft 102A. However, when referring to any arbitrary example or the generic example of FIG. 1, the first device 102 is used without a distinguishing letter "A". Unless otherwise indicated in a specific context, each generic description (e.g., a description of the first device 102) is also a description of each of the specific examples (e.g., the tanker aircraft 102A).

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more processors ("processor(s)" 120 in FIG. 1), which indicates that in some implementations the system 100 includes a single processor 120 and in other implementations the system 100 includes multiple processors 120. For ease of reference herein, such features may be introduced as "one or more" features and subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates a system 100 including several devices including a first device 102 that is configured to generate a proposed maneuver to mate a first connector 106 of the first device 102 with a second connector 116 of a second device 112 based on image data and position data. In the example illustrated in FIG. 1, the first device 102 includes or corresponds to a primary device, as described above, and the second device 112 includes or corresponds to a secondary device, as described above. For example, the first device 102 includes a trained autonomous agent 132 and may be configured to service or support the second device 112. The second device 112 includes a device or system configured to couple to the first device 102 and possibly to be serviced by or supported by the first device 102.

The first device 102 includes a moveable coupling system 104 configured to move the first connector 106 relative to the second connector 116 of the second device 112. For example, the moveable coupling system 104 may include a steerable boom of a refueling system, as described in further detail in FIGS. 2 and 3. As another example, the moveable coupling system 104 may include a steerable docking arm of a docking system, as described in further detail in FIGS. 5 and 6. The above referenced examples are merely illustrative and are not limiting.

The first device 102 also includes a camera 122, one or more sensors 124, one or more processors 120, and a memory 140. In the example illustrated in FIG. 1, the first device 102 also includes one or more image processors 114. In some implementations, the image processor(s) 114 and the processor(s) 120 are combined. To illustrate, one or more GPUs, one or more central processing units (CPUs), or one or more other multi-core or multi-thread processing units may serve as both the image processor(s) 114 and the processor(s) 120.

In FIG. 1, the sensor(s) 124 include position encoders 126 and one or more supplemental sensors 128. The position encoders 126 are coupled to the moveable coupling system 104 and configured to generate position data 178 indicating a position in 3D space 108 of the first connector 106. For example, the position encoders 126 may generate data that indicates an angle of one or more joints of the moveable coupling system 104, a deployment length of the moveable coupling system 104, other 3D position data, or a combination thereof. In this example, the position data 178 indicates the position in a reference frame that is associated with the first device 102 and is independent of the second device 112. To illustrate, an angle of a joint of the moveable coupling system 104 may be indicated relative to a reference frame of the joint or a reference frame of the first device 102, which angle, by itself, does not indicate a position of the first connector 106 or the joint relative to the second device 112 because the second device 112 is moveable relative to the first device 102.

The supplemental sensor(s) 128, when present, are configured to generate supplemental sensor data (e.g., additional position data) indicative of relative positions of the first device 102 and the second device 112 in the 3D space 108. For example, the supplemental sensor(s) 128 may include a range finder (e.g., a laser range finder), and the supplemental sensor data may include range data (e.g., a distance from the range finder to the second device 112). Additionally, or in the alternative, the supplemental sensor(s) 128 may include a radar system, and the supplemental sensor data may include radar data (e.g., radar returns indicating a distance to the second device 112, a direction to the second device 112, or both). Additionally, or in the alternative, the supplemental sensor(s) 128 may include a lidar system, and the supplemental sensor data may include lidar data (e.g., lidar returns indicating a distance to the second device 112, a direction to the second device 112, or both). Additionally, or in the alternative, the supplemental sensor(s) 128 may include a sonar system, and the supplemental sensor data may include sonar data (e.g., sonar returns indicating a distance to the second device 112, a direction to the second device 112, or both). Additionally, or in the alternative, the supplemental sensor(s) 128 may include one or more additional cameras (e.g., in addition to a camera 122), and the supplemental sensor data may include stereoscopic image data.

The camera 122 of the first device 102 is configured to generate image data (e.g., image(s) 170) that depict at least a portion of the moveable coupling system 104 and at least a portion of the second device 112. In some implementations, the image(s) 170 include a stream of real-time (e.g., subject to only minor video front-end processing delays and buffering) video frames that represent relative positions of the moveable coupling system 104 and the second device 112.

In the example of FIG. 1, the image(s) 170 are processed by the image processor(s) 114 to generate processed image data. For example, the image processor(s) 114 of FIG. 1 include a downsampler 134 that is configured to generate one or more downsampled images 172 based on the image(s) 170. In some implementations, the downsampler 134 can include multiple downsampling stages that generate different levels of downsampled image(s) 172. To illustrate, a source image from the camera 122 can be downsampled a first time to generate a first downsampled image, and the first downsampled image can be downsampled one or more additional times to generate a second downsampled image. The downsampled image(s) 172 may include the first downsampled image, the second downsampled image, one or more additional images, or a combination thereof. Thus, in some implementations, multiple downsampled images 172 may be generated for each source image 170 from the camera 122.

In the example of FIG. 1, the image processor(s) 114 also include a segmentation model 136 that is configured to generate one or more segmentation maps 174 ("seg. map(s)" in FIG. 1) based on the image(s) 170. The segmentation map(s) 174 associated with a first image of the image(s) 170 represent distinct regions of the first image. For example, the segmentation map 174 may distinguish boundaries between various portions of the second device 112; boundaries between the second device 112 and portion of the first device 102 represented in the first image; boundaries between the second device 112, the first device 102, or both, and a background region; or a combination thereof.

The image(s) 170, the downsampled images(s) 172, the segmentation map(s) 174, or any combination thereof, are provided as input to a feature extraction model 130 to generate feature data 176. In a particular aspect, the feature data 176 includes first coordinates representing key points of the moveable coupling system 104 and includes second coordinates representing key points of the second device 112. For example, a representative display 152 illustrating an image 154 of the image(s) 170 with at least a portion of the feature data 176 is shown in FIG. 1. In this example, the image 154 depicts a first portion 156 of the first device 102 (such as a portion of the moveable coupling system 104) and a second portion 162 of the second device 112. The first portion 156 includes key points 158 representing or represented by first coordinates 160, and the second portion 162 includes key points 164 representing or represented by second coordinates 166. The key points 158, 164 and the coordinates 160, 166 are determined by the feature extraction model 130 and are indicated in the feature data 176.

In some implementations, the feature extraction model 130 includes or corresponds to a machine-learning model. To illustrate, the feature extraction model 130 may include or correspond to a neural network that is trained to detect the key points 158, 164 in the image 154 and to determine coordinate locations within the image 154 that are associated with each key point. In some implementations, the feature extraction model 130 includes or corresponds to one or more convolutional neural networks, such as a U-CNN. In such implementations, the downsampler 134 and the feature extraction model 130 may be combined in the U-CNN architecture such that a particular image of the image(s) 170 is evaluated by CNNs at multiple distinct resolutions to generate the feature data 176. Additionally, or in the alternative, the downsampler 134 and the segmentation model 136 are combined in a U-CNN architecture, which enables the segmentation map to be formed based on multiple resolutions of the images 170.

In a particular aspect, the feature extraction model 130 is configured to generate the feature data 176 based, at least in part, on a known geometry 142 of the second device 112. For example, the memory 140 of FIG. 1 stores data representing the known geometry 142 of the second device 112, and the feature extraction model 130 compares key points detected in the image(s) 170 with the known geometry 142 to detect and correct misplaced key points. As a specific example, the feature extraction model 130 may include an imputation network to compare the known geometry 142 to the key points and to remove or reposition erroneous key points. In some aspects, the feature extraction model 130 also includes a Kalman filter to temporally filter the image(s) 170 and/or feature data 176 to improve accuracy of the feature data 176.

The feature data 176 and the position data 178 are provided as input to a trained autonomous agent 132. In a particular aspect, the trained autonomous agent 132 is configured to generate a proposed maneuver 180 to mate the first connector 106 with the second connector 116 based on the feature data 176 and the position data 178. In a particular implementation, the trained autonomous agent 132 includes or corresponds to a neural network. As an example, the neural network of the trained autonomous agent 132 is trained using one or more reinforcement learning techniques. To illustrate, during a training phase, the reinforcement learning techniques may train the neural network based on in part on a reward that is determined by comparing a proposed maneuver 180 output by the neural network to an optimum or target maneuver in particular circumstances (e.g., for a particular set of input feature data 176 and a particular set of position data 178). In this context, the optimum or target maneuver may include, for example, a shortest or least cost maneuver to mate the connectors 106, 116; a maneuver that mimics a maneuver performed by one or more skilled human operators under similar circumstances; a maneuver that satisfies a set of safety conditions, such as not causing any undesired contact between portions of the devices 102, 112; a maneuver that corresponds to maneuvering characteristics specified during or before training; or a combination thereof.

The proposed maneuver 180 generated by the trained autonomous agent 132 may be output to a maneuvering system 144, to a graphical user interface (GUI) engine 150, or both. The maneuvering system 144 is configured to generate and/or execute commands to reposition the first device 102, the moveable coupling system 104, or both. To illustrate, the maneuvering system 144 may include or correspond to a control system configured to command repositioning of the moveable coupling system 104 based on the proposed maneuver 180. As one specific example, when the first device 102 includes a tanker aircraft, the maneuvering system 144 includes a flight control system of the tanker aircraft, a boom control system of a refueling boom, or both.

In some implementations, the maneuvering system 144 includes or is coupled to one or more instruments 146, a maneuver limiter 148, or both. The instrument(s) 146 include or are coupled to control and/or safety sensors associated with the first device 102. In a particular implementations, data from the instrument(s) 146 is provided to the trained autonomous agent 132 to generate the proposed maneuver 180. For example, when the first device 102 corresponds to a tanker aircraft, the instrument(s) 146 may include flight instruments (e.g., an altimeter, an angle of attack indicator, a heading indicator, an airspeed indicator, etc.) of the tanker aircraft. In this example, flight data generated by the instrument(s) 146 may be provided to the trained autonomous agent 132 (along with the feature data 176 and the position data 178), to generate the proposed maneuver 180.

The maneuver limiter 148 performs checks associated with the maneuvering system 144 to determine whether a maneuver limit criterion is satisfied. If the maneuver limiter 148 determines that the maneuver limit criterion is satisfied, the maneuver limiter 148 causes the maneuvering system 144 to limit the maneuvering operations that can be performed. As one example, the maneuver limiter 148 may provide data to the trained autonomous agent 132 to limit a set of maneuvers that can be selected as the proposed maneuver 180. To illustrate, the maneuver limit criterion may indicate a minimum altitude for air-to-air refueling, and the maneuver limiter 148 may prevent the trained autonomous agent 132 from proposing a maneuver to mate a boom refueling connector (e.g., the first connector 106) to a fuel receptacle (e.g., the second connector 116) when an altimeter (e.g., one of the instruments 146) indicates that the altitude of a tanker aircraft (e.g., the first device 102) is below the minimum altitude. Additionally, or in the alternative, the maneuver limiter 148 may limit maneuvering operations that can be executed by the first device 102 or the moveable coupling system 104 based on the proposed maneuver 180.

The GUI engine 150 is configured to generate the display 152 and to provide the display 152 to a display device onboard or offboard the first device 102. The display 152 includes the image 154 depicting the first portion 156 of the first device 102, the second portion 162 of the second device 112, or both. In some implementations, the key points 158, 164; the coordinates 160, 166; or both are depicted in the display 152. In other implementations, the key points 158, 164 and the coordinates 160, 166 are determined as part of the feature data 176 but are not depicted in the display 152. In some implementations, the display 152 includes one or more graphical elements 168 overlaying at least a portion of the image 154 and indicating the proposed maneuver 180. For example, the graphical element(s) 168 may indicate a direction to steer the moveable coupling system 104, an amount (e.g., angular displacement or distance) to steer the moveable coupling system 104, or both.

The trained autonomous agent 132, in conjunction with other features of the first device 102, improves efficiency (e.g., by reducing training costs), reliability, and repeatability of operations to mate the first connector 106 and the second connector 116. For example, the trained autonomous agent 132 can mimic maneuvers performed by highly skilled human operators without the time and cost required to train the operators. Further, the trained autonomous agent 132 can improve on maneuvers performed by the skilled human operators by determining more optimal maneuvers than those executed by the skilled human operators.

Although FIG. 1 depicts the first device 102 including the supplemental sensor(s) 128, in some implementations the supplemental sensors 128 are omitted or are not used to generate input to the trained autonomous agent 132. For example, the position data 178 may be determined solely from output of the position encoders 126.

Although FIG. 1 depicts the first device 102 including the image processor(s) 114, in other implementations, the image(s) 170 are not pre-processed by the image processor(s) 114 before they are provided as input to the feature extraction model 130.

Although FIG. 1 depicts the maneuvering system 144, the GUI engine 150, and the display 152 offboard the first device 102, in other implementation, one or more of the maneuvering system 144, the GUI engine 150, or the display 152 are onboard the first device 102.

Although the segmentation model 136, the downsampler 134, and the feature extraction model 130 are depicted as separate components in FIG. 1, in other implementations the described functionality of two or more of the segmentation model 136, the downsampler 134, and the feature extraction model 130 can be performed by a single component. In some implementations, one or more of the segmentation model 136, the downsampler 134, and the feature extraction model 130 can be represented in hardware, such as via an application-specific integrated circuit (ASIC) or a field-programmable gate array (FPGA). In some implementations, the operations described with reference to one or more of the segmentation model 136, the downsampler 134, and the feature extraction model 130 are performed by a single processor (e.g., the processor(s) 120 or the image processor(s) 114) or by multiple processors using serial operations, parallel operations, or combinations thereof.

Figure 2:
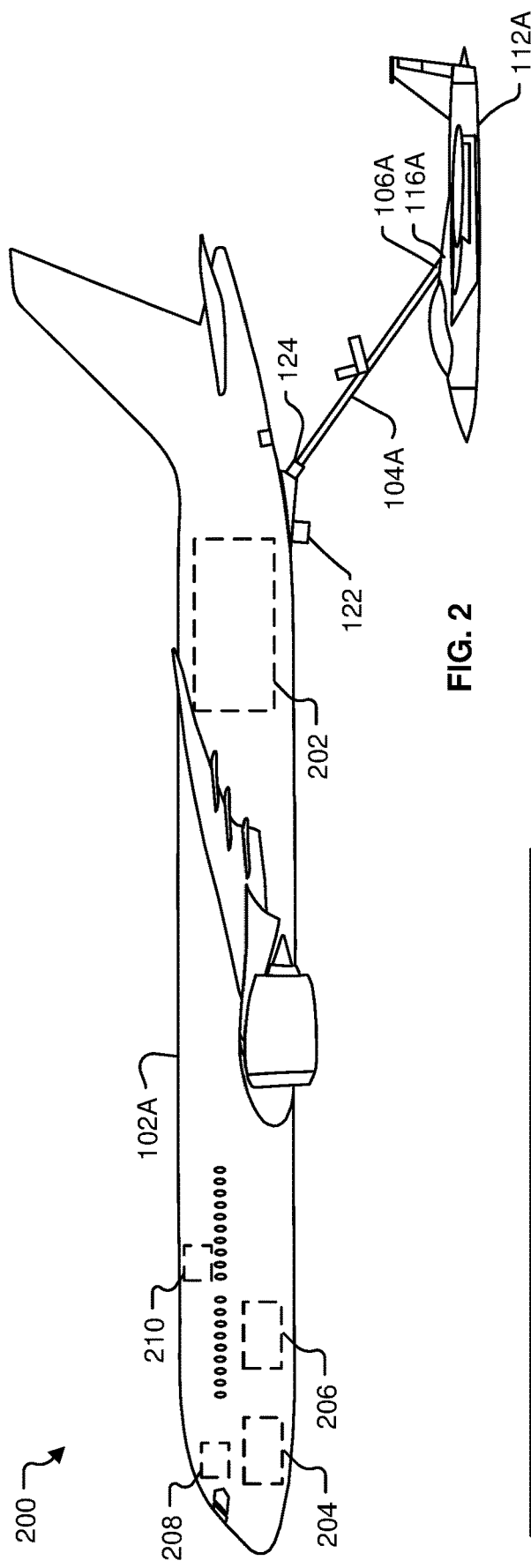
FIG. 2 is a diagram that illustrates a system configured to generate a proposed maneuver to mate a first connector with a second connector based on image data and position data.

FIG. 2 is a diagram that illustrates a system 200 configured to generate a proposed maneuver to mate a first connector with a second connector based on image and position data. The system 200 is a specific, non-limiting example of the system 100. In the example of FIG. 2, the first device 102 corresponds to a tanker aircraft 102A, and the moveable coupling system 104 corresponds to a refueling boom 104A. In this example, the first connector 106 corresponds to a refueling connector 106A of the refueling boom 104A. Further, the second device 112 corresponds to a receiving aircraft 112A, and the second connector 116 corresponds to the receiving receptacle 116A of the receiving aircraft 112A.

In FIG. 2, the tanker aircraft 102A includes the sensor(s) 124 and the camera 122, each of which operates as described with reference to FIG. 1. To illustrate, the sensor(s) 124 may include the position encoders 126 that generate the position data 178 indicating a position of the refueling boom 104A or of the refueling connector 106A in a frame of reference of the tanker aircraft 102A.

Additionally, the tanker aircraft 102A includes a fuel tank 202 to supply fuel, via the refueling boom 104A, to the receiving aircraft 112A. The tanker aircraft 102A also includes a flight control system 204 coupled to one or more flight instruments 208. The flight control system 204 is configured to control or facilitate control of flight operations of the tanker aircraft 102A. The tanker aircraft 102A also includes a boom controller 206 to control or facilitate control of the refueling boom 104A. The flight instrument(s) 208, the flight control system 204, the boom controller 206, or a combination thereof, are coupled to aircraft sensors 210 to receive flight data, which may be used by the trained autonomous agent 132 to generate the proposed maneuver 180 or may be used by the maneuver limiter 148 to limit the propose maneuver 180. In some implementations, the flight control system 204, the boom controller 206, or both, include, correspond to, or are included within the maneuvering system 144 of FIG. 1.

Figure 3:
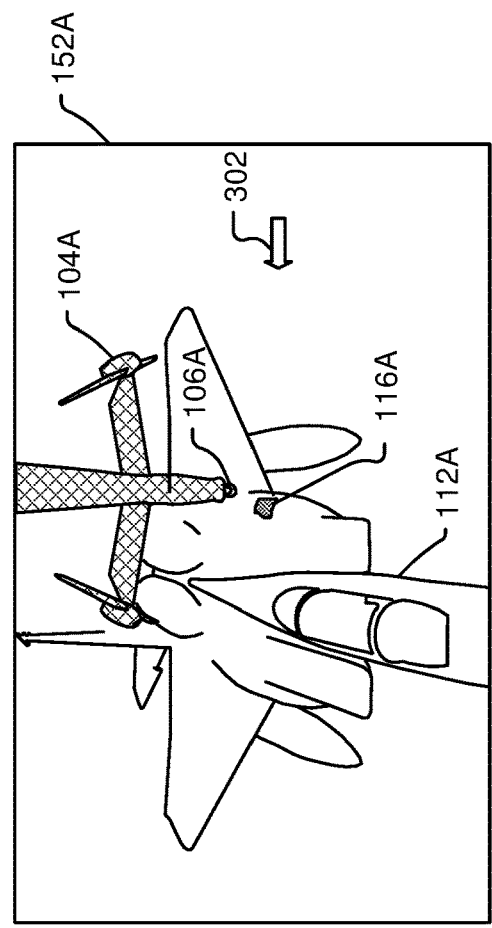
FIG. 3 is a diagram that illustrates an example of a display generated by the system of FIG. 2.

The camera 122 of the tanker aircraft 102A is positioned to capture the image(s) 170 depicting at least a portion of the refueling boom 104A and the receiving aircraft 112A during an air-to-air refueling operation. FIG. 3 is a diagram that illustrates a particular example of a display 152A generated based on an image from the camera 122 of FIG. 2. In FIG. 3, the display 152A is a particular example of the display 152 of FIG. 1. For example, the display 152A depicts a portion of the receiving aircraft 112A and a portion of the refueling boom 104A. In this specific example, the display 152A also depicts the refueling connector 106A and the refueling receptacle 116A of the receiving aircraft 112A. Also, in the example illustrated in FIG. 3, the display 152A includes a graphical element 302 indicating a proposed maneuver 180. In the example illustrated in FIG. 3, the proposed maneuver 180 suggests moving the refueling connector 106A to the left (in the frame of reference illustrated).

Figure 4A:
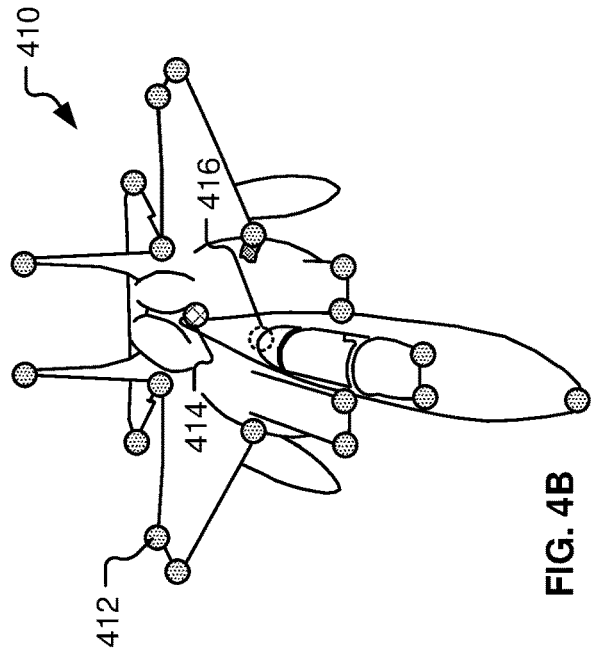
FIGS. 4A, 4B, 4C, and 4D are diagrams that various aspects of image processing and feature detection by the system of FIG. 2.
Figure 4B:
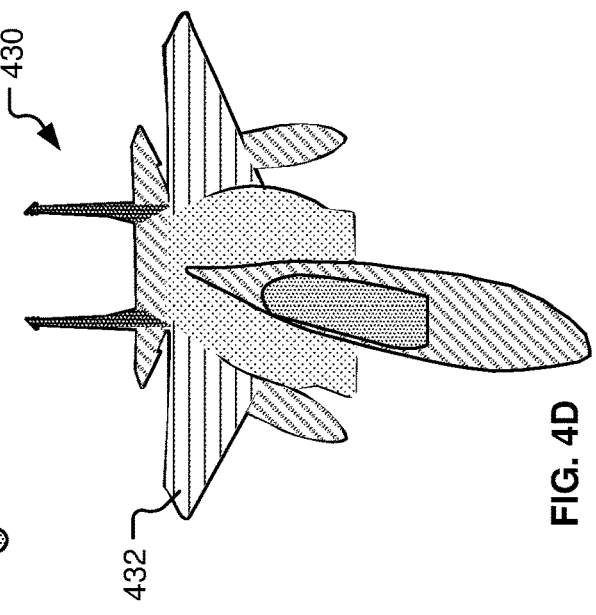
Figure 4C:
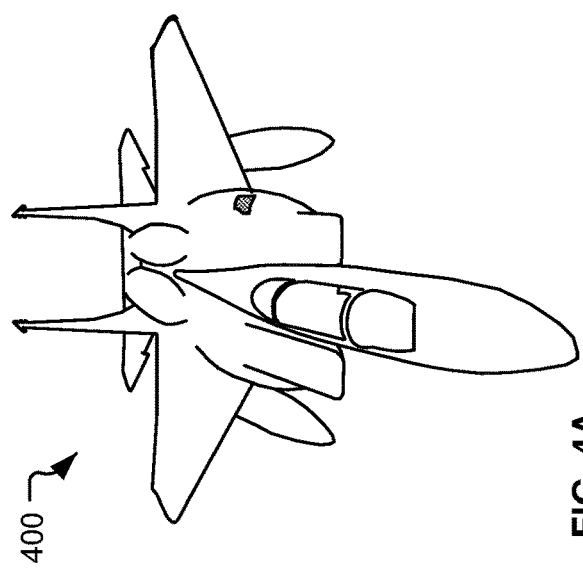
Figure 4D:
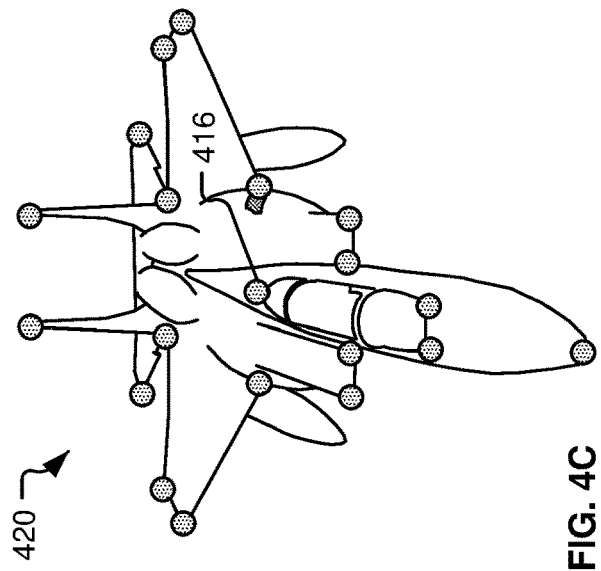

FIGS. 4A, 4B, 4C, and 4D are diagrams that illustrate various aspects of image processing and feature detection by the system 200 of FIG. 2 according to some implementations. In particular, FIG. 4A illustrates an example of a source image 400 that depicts the receiving aircraft 112A of FIG. 2. FIG. 4B depicts an example 410 of key points, such as representative key points 412 and 414, detected by the feature extraction model 130 of FIG. 1. In the example 410 of FIG. 4B, the key point 414 is an example of a misplaced key point which should be placed at a location 416 based on the known geometry 142 of the receiving aircraft 112A. FIG. 4C depicts an example 420 in which the key point 414 of FIG. 4B has been repositioned based on the known geometry 142 of the receiving aircraft 112A. FIG. 4D illustrates an example 430 in which the source image 400 has been processed by the segmentation model 136 to generate a segmentation map 174. For example, in FIG. 4D, various segments, such as a representative segment 432, of the source image 400 are differentiated by different fill patterns.

FIG. 5 is a diagram that illustrates a system 500 configured to generate a proposed maneuver to mate a first connector with a second connector based on image data and position data. The system 500 is a specific, non-limiting example of the system 100. In the example of FIG. 5, the first device 102 corresponds to a first spacecraft 102B, and the moveable coupling system 104 corresponds to a docking arm 104B. In this example, the first connector 106 corresponds to a docking connector 106B of the docking arm 104B. Further, the second device 112 corresponds to a second spacecraft 112B, and the second connector 116 corresponds to a docking connector 116B of the second spacecraft 112B.

In FIG. 5, the first spacecraft 102B includes the sensor(s) 124 and the camera 122, each of which operates as described with reference to FIG. 1. To illustrate, the sensor(s) 124 may include the position encoders 126 that generate the position data 178 indicating a position of the docking arm 104B or of the docking connector 106B relative to a frame of reference of the first spacecraft 102B.

The first spacecraft 102B includes a control system 504 coupled to one or more instruments 506. The control system 504 is configured to control or facilitate control of operations of the first spacecraft 102B. The first spacecraft 102B also includes a docking controller 508 to control or facilitate control of the docking arm 104B. The control system 504, the docking arm 104B, or both, are coupled to sensors 510 to receive data, which may be used by the trained autonomous agent 132 to generate the proposed maneuver 180 or may be used by the maneuver limiter 148 to limit the proposed maneuver 180. In some implementations, the control system 504, the docking controller 508, or both, include, correspond to, or are included within the maneuvering system 144 of FIG. 1.

The camera 122 of the first spacecraft 102B is positioned to capture the image(s) 170 depicting at least a portion of the docking arm 104B and the second spacecraft 112B during a docking operation. FIG. 6 is a diagram that illustrates a particular example of a display 152B generated based on an image from the camera 122 of FIG. 5. In FIG. 6, the display 152B is a particular example of the display 152 of FIG. 1. For example, the display 152B depicts a portion of the second spacecraft 112B and a portion of the docking arm 104B. In this specific example, the display 152B also depicts the docking connector 106B and the docking connector 116B of the second spacecraft 112B. Also, in the example illustrated in FIG. 6, the display 152B includes a graphical element 602 indicating a proposed maneuver 180. In the example illustrated in FIG. 6, the proposed maneuver 180 suggests moving the docking connector 106B to the left (in the frame of reference illustrated).

Figure 7B:
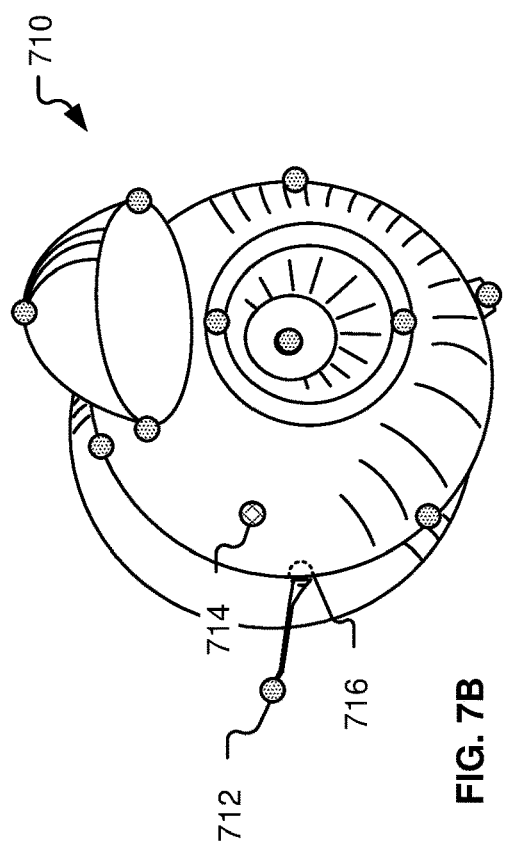
FIGS. 7A, 7B, 7C, and 7D are diagrams that various aspects of image processing and feature detection by the system of FIG. 5.
Figure 7D:
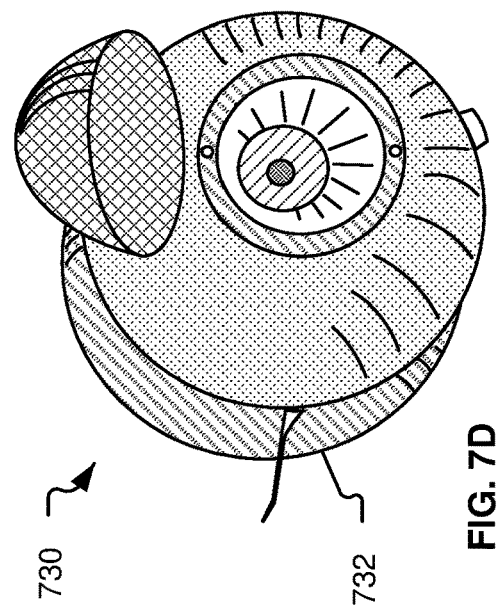
Figure 7A:
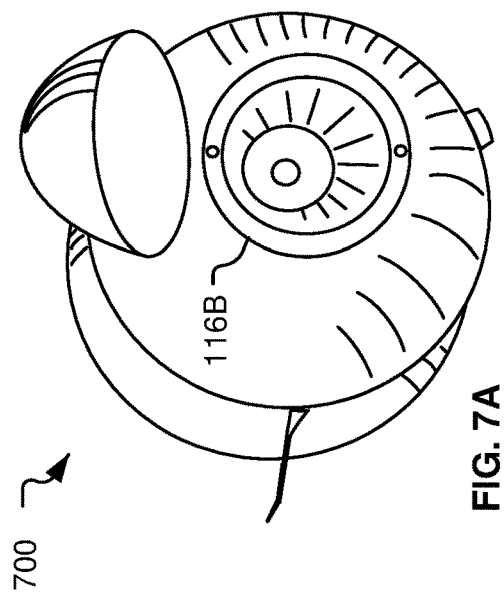
Figure 7C:
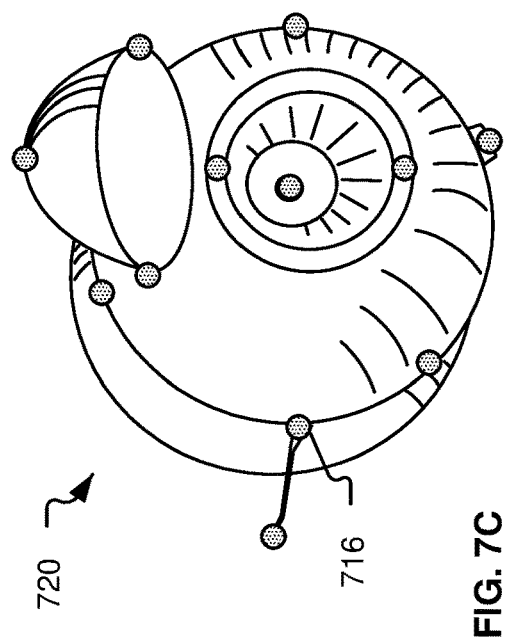

FIGS. 7A, 7B, 7C, and 7D are diagrams that illustrate various aspects of image processing and feature detection by the system 500 of FIG. 5 in accordance with some implementations. In particular, FIG. 7A illustrates an example of a source image 700 that depicts the second spacecraft 112B of FIG. 5. FIG. 7B depicts an example 710 of key points, including representative key points 712 and 714, detected by the feature extraction model 130 of FIG. 1. In the example 710 of FIG. 7B, the key point 714 is an example of a misplaced key point which should be placed at a location 716 based on the known geometry 142 of the second spacecraft 112B. FIG. 7C depicts an example 720 in which the key point 714 of FIG. 7B has been repositioned based on the known geometry 142 of the second spacecraft 112B. FIG. 7D illustrates an example 730 in which the source image 700 has been processed by the segmentation model 136 to generate a segmentation map 174. For example, in FIG. 7D, various segments of the source image 700, such as a representative segment 732, are differentiated by different fill patterns.

Figure 8:
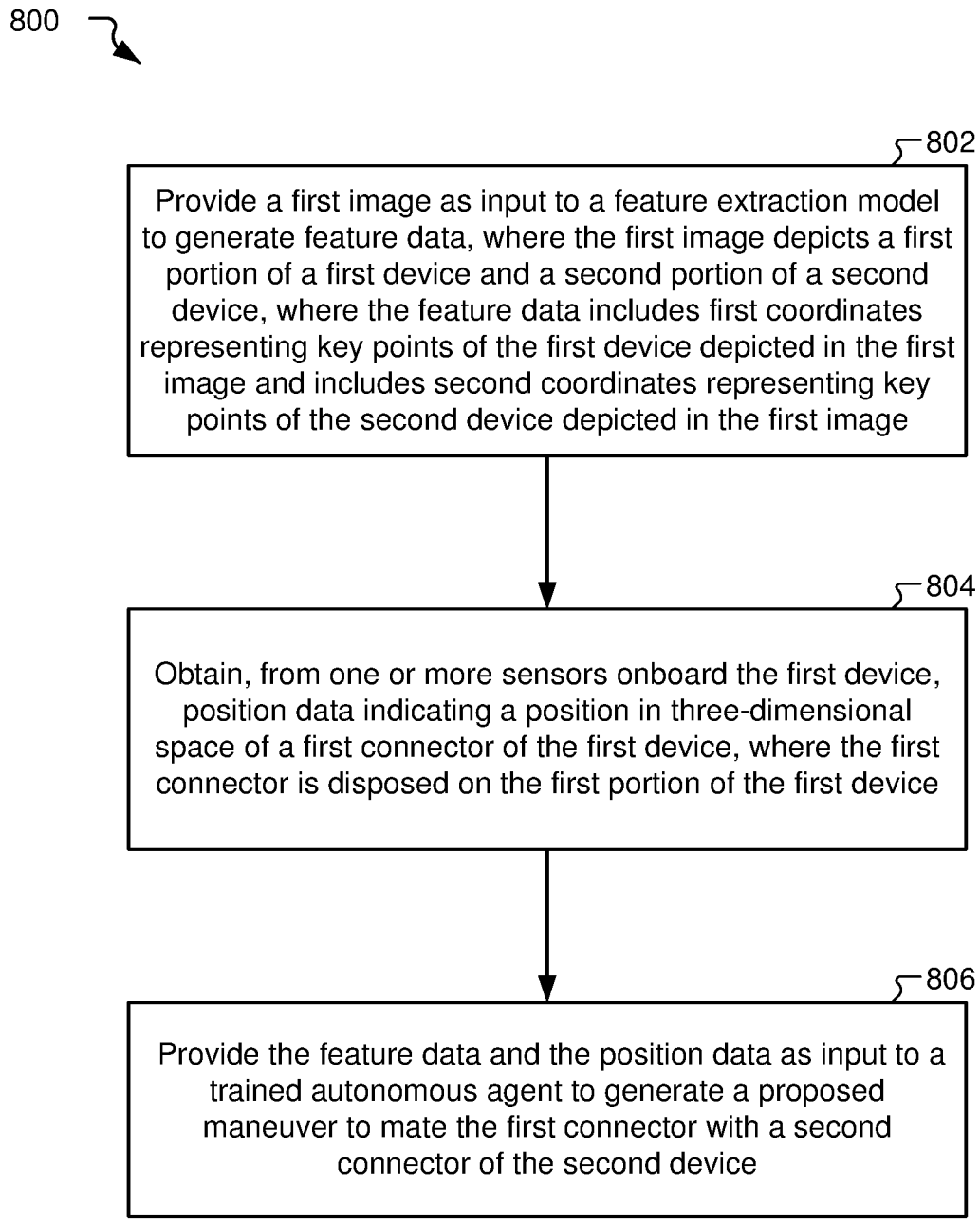
FIG. 8 is a flowchart of an example of a method of generating a proposed maneuver to mate a first connector with a second connector based on image data and position data.

FIG. 8 is a flowchart of an example of a method 800 of generating a proposed maneuver to mate a first connector with a second connector based on image data and position data. The method 800 may be performed by the first device 102 or one or more components thereof, such as by the image processor(s) 114, the processor(s) 120, the downsampler 134, the segmentation model 136, the feature extraction model 130, the trained autonomous agent 132, or a combination thereof.

The method 800 includes, at 802, providing a first image as input to a feature extraction model to generate feature data. The first image depicts a first portion of a first device and a second portion of a second device. For example, one or more of the image(s) 170, one or more of the downsampled image(s) 172, or both, depict the first portion 156 and the second portion 162 and may be provided as input to the feature extraction model 130 of FIG. 1. The feature data generated by the feature extraction model includes first coordinates representing key points of the first device depicted in the first image and includes second coordinates representing key points of the second device depicted in the first image. For example, the feature data 176 may indicate the first coordinates 160 representing the key points 158 depicted in the image 154 and may indicate the second coordinates 166 representing the key points 164 depicted in the image 154.

The method 800 also includes, at 804, obtaining, from one or more sensors onboard the first device, position data indicating a position in 3D space of a first connector of the first device, where the first connector is disposed on the first portion of the first device. For example, the sensor(s) 124 generate the position data 178, which indicates the position of the first connector 106 in a frame of reference of the first device 102.

The method 800 further includes, at 806, providing the feature data and the position data as input to a trained autonomous agent to generate a proposed maneuver to mate the first connector with a second connector of the second device. For example, the processor(s) 120 provide the feature data 176 and the position data 178 as input to the trained autonomous agent 132 to generate the proposed maneuver 180 to mate the first connector 106 and the second connector 116.

Figure 9:
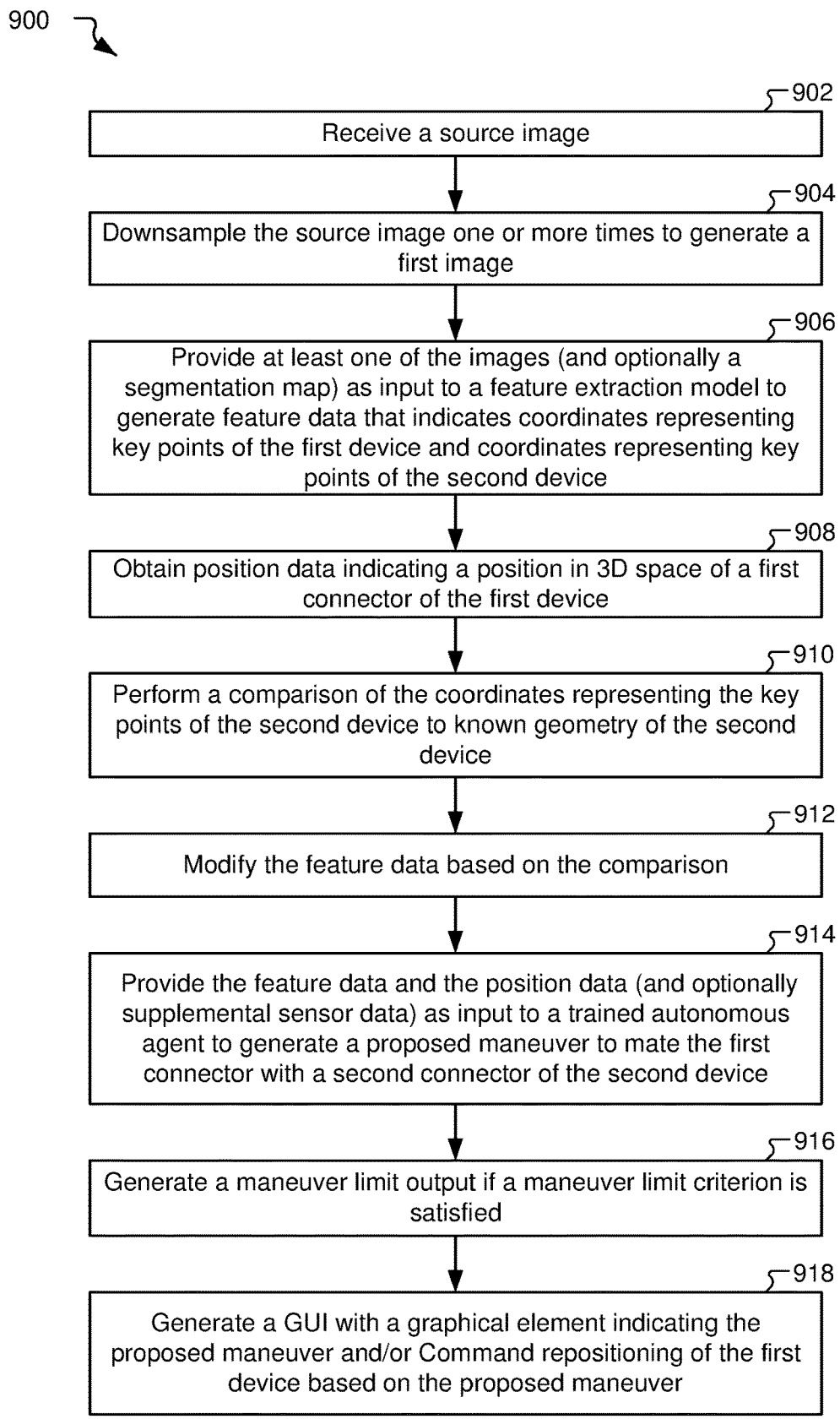
FIG. 9 is a flowchart of another example of a method of generating a proposed maneuver to mate a first connector with a second connector based on image data and position data.

FIG. 9 is a flowchart of another example of a method 900 of generating a proposed maneuver to mate a first connector with a second connector based on image data and position data. The method 900 may be performed by the first device 102 or one or more components thereof, such as by the image processor(s) 114, the processor(s) 120, the downsampler 134, the segmentation model 136, the feature extraction model 130, the trained autonomous agent 132, or a combination thereof.

The method 900 includes, at 902, receiving a source image. For example, the source image may include or correspond to one of the image(s) 170 captured by the camera 122.

The method 900 includes, at 904, downsampling the source image one or more times to generate a first image. For example, the downsampler 134 may downsample one of the image(s) 170 to generate one of the downsampled image(s) 172 as the first image. In some examples, the downsampler 134 downsamples the source image more than one time, such as two or more times, to generate the first image. To illustrate, the downsampler 134 may downsample the source image one or more times to generate the first image and may further downsample the first image one or more additional times to generate a second image.

The method 900 includes, at 906, providing at least one of the images (e.g., the source image, the first image, the second image, or a combination thereof), as input to a feature extraction model to generate feature data. In some examples, the method 900 includes generating a segmentation map based on at least one of the images and providing the segmentation map as input to the feature extraction model as well. For example, one or more of the image(s) 170, one or more of the downsampled image(s) 172, the segmentation map 174, or combination thereof, are provided as input to the feature extraction model 130 of FIG. 1. In this example, the feature data generated by the feature extraction model 130 may indicate the first coordinates 160 representing the key points 158 depicted in the image 154 and the second coordinates 166 representing the key points 164 depicted in the image 154.

The method 900 includes, at 908, obtaining position data indicating a position in 3D space of a first connector of the first device. For example, the sensor(s) 124 may generate the position data 178, which indicates the position of the first connector 106 in a frame of reference of the first device 102.

The method 900 includes, at 910, performing a comparison of the coordinates representing the key points of the second device to known geometry of the second device. For example, the second coordinates 166 of the key points 164 may be compared to the known geometry 142 of the second device 112 to determine whether any key points are misplaced.

The method 900 includes, at 912, modifying the feature data based on the comparison. For example, the feature data 176 may be modified in response to determining, based on the comparison of the known geometry 142 and the second coordinates 166, that one or more of the key points 164 is misplaced. In this example, the misplaced key points 164 may be repositioned in the feature data 176 or omitted from the feature data 176.

The method 900 includes, at 914, providing the feature data and the position data as input to a trained autonomous agent to generate a proposed maneuver to mate the first connector with a second connector of the second device. For example, the processor(s) 120 may provide the feature data 176 and the position data 178 as input to the trained autonomous agent 132 to generate the proposed maneuver 180 to mate the first connector 106 and the second connector 116. In some examples, the position data 178 includes supplemental sensor data from the supplemental sensors 128, which is also provided as input to the trained autonomous agent 132.

The method 900 includes, at 916, generating a maneuver limit output if a maneuver limit criterion is satisfied. For example, the maneuver limiter 148 of FIG. 1 may determine whether the maneuver limit criterion is satisfied and may generate the maneuver limit output in response to the maneuver limit criterion being satisfied. In some examples, the maneuvering limit output is also provided as input to the trained autonomous agent to limit the maneuvers that can be selected as the proposed maneuver.

The method 900 includes, at 918, generating a GUI with a graphical element indicating the proposed maneuver, commanding repositioning of the first device based on the proposed maneuver, or both. For example, the proposed maneuver 180 of FIG. 1 may be provided to the GUI engine 150 which generates the display 152. In this example, the display 152 includes the graphical element(s) representing the proposed maneuver 180. As another example, the proposed maneuver 180 may be provided to the maneuvering system 144 which may cause the first device 102 or a portion thereof (such as the moveable coupling system 104) to execute the proposed maneuver 180.

Figure 10:
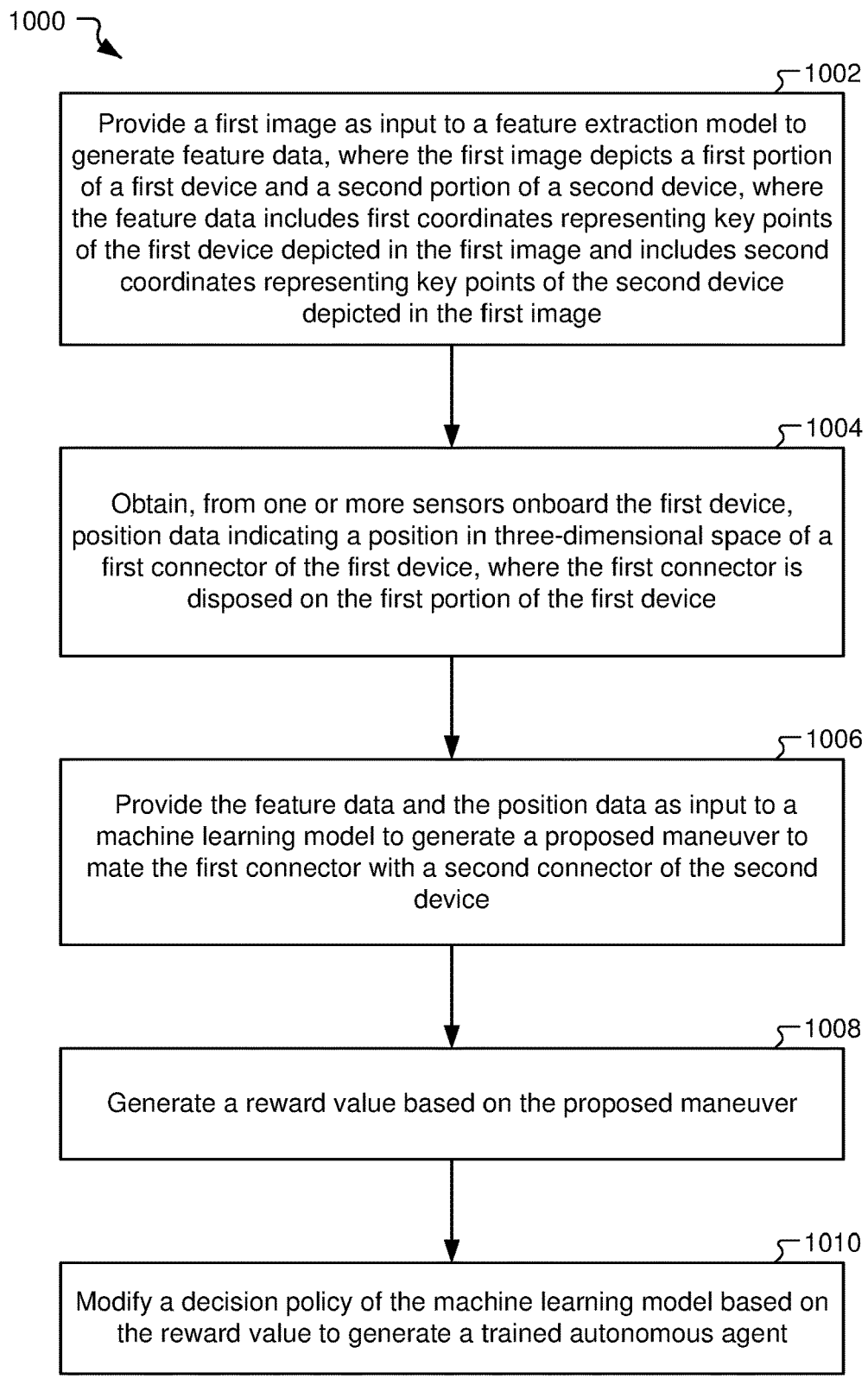
FIG. 10 is a flowchart of an example of a method of training an autonomous agent to generate a proposed maneuver to mate a first connector with a second connector based on image data and position data.

FIG. 10 is a flowchart of an example of a method 1000 of training an autonomous agent to generate a proposed maneuver to mate a first connector with a second connector based on image data and position data. The method 1000 may be performed by one or more processors onboard the first device 102 of FIG. 1 or offboard the first device 102. For example, the method 1000 may be performed at the image processor(s) 114, the processor(s) 120, or the processor(s) 1320 of FIG. 13.

The method 1000 includes, at 1002, providing a first image as input to a feature extraction model to generate feature data. The first image depicts a first portion of a first device and a second portion of a second device. For example, one or more of the image(s) 170, one or more of the downsampled image(s) 172, or both, depict the first portion 156 and the second portion 162 and may be provided as input to the feature extraction model 130 of FIG. 1. The feature data generated by the feature extraction model includes first coordinates representing key points of the first device depicted in the first image and includes second coordinates representing key points of the second device depicted in the first image. For example, the feature data 176 may indicate the first coordinates 160 representing the key points 158 depicted in the image 154 and may indicate the second coordinates 166 representing the key points 164 depicted in the image 154.

The method 1000 also includes, at 1004, obtaining, from one or more sensors onboard the first device, position data indicating a position in 3D space of a first connector of the first device, where the first connector is disposed on the first portion of the first device. For example, the sensor(s) 124 generate the position data 178, which indicates the position of the first connector 106 in a frame of reference of the first device 102.

The method 1000 further includes, at 1006, providing the feature data and the position data as input to a machine-learning model to generate a proposed maneuver to mate the first connector with a second connector of the second device. For example, the feature data 176 and the position data 178 may be provided as input to the machine-learning model to generate the proposed maneuver 180 to mate the first connector 106 and the second connector 116.

The method 1000 further includes, at 1008, generating a reward valued based on the proposed maneuver. For example, the reward value may be determined using a value function of a reinforcement learning technique.

The method 1000 further includes, at 1010, modifying a decision policy of the machine-learning model based on the reward value to generate a trained autonomous agent. For example, a decision policy that generates the proposed maneuver may be updated.

In some implementations, the image data, the position data, or other data used for training the machine-learning model to generate the trained autonomous agent is simulated or prerecorded. For example, a simulator of the system 100 may be used to generate the image data, the position data, or both.

Figure 11:
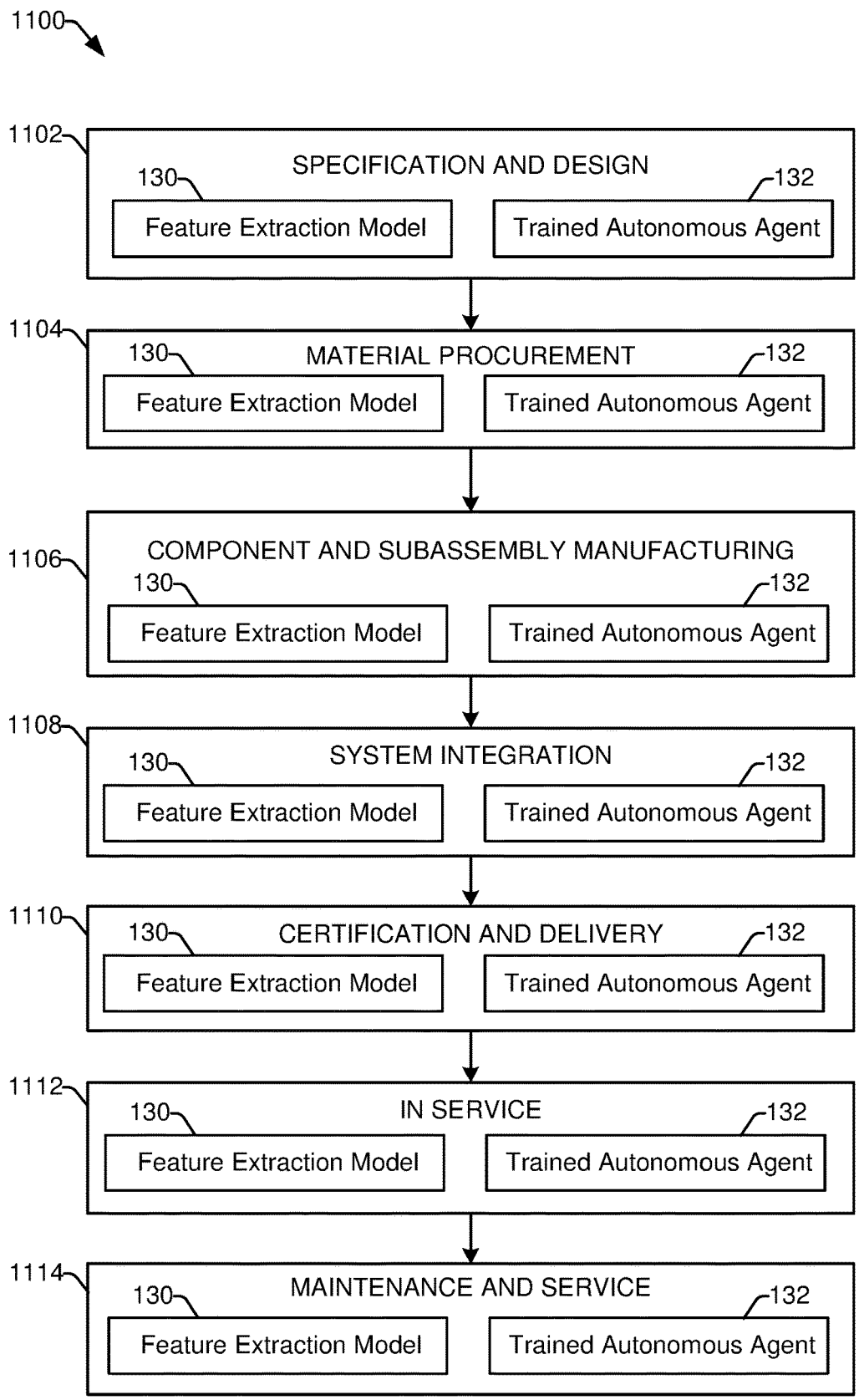
FIG. 11 is a flowchart of an example of a lifecycle of an aircraft configured to generate a proposed maneuver to mate a first connector with a second connector based on image data and position data.

FIG. 11 is a flowchart of an example of a lifecycle 1100 of an aircraft configured to generate a proposed maneuver to mate a first connector with a second connector based on image data and position data. During pre-production, the exemplary lifecycle 1100 includes, at 1102, specification and design of an aircraft, such as the tanker aircraft 102A described with reference to FIG. 2. During specification and design of the aircraft, the lifecycle 1100 may include specification and design of the feature extraction model 130, the trained autonomous agent 132, or both. At 1104, the lifecycle 1100 includes material procurement, which may include procuring materials for the feature extraction model 130, the trained autonomous agent 132, or both.

During production, the lifecycle 1100 includes, at 1106, component and subassembly manufacturing and, at 1108, system integration of the aircraft. For example, the lifecycle 1100 may include component and subassembly manufacturing of the feature extraction model 130, the trained autonomous agent 132, or both, and system integration of the feature extraction model 130, the trained autonomous agent 132, or both. At 1110, the lifecycle 1100 includes certification and delivery of the aircraft and, at 1112, placing the aircraft in service. Certification and delivery may include certification of the feature extraction model 130, the trained autonomous agent 132, or both, to place the feature extraction model 130, the trained autonomous agent 132, or both, in service. While in service by a customer, the aircraft may be scheduled for routine maintenance and service (which may also include modification, reconfiguration, refurbishment, and so on). At 1114, the lifecycle 1100 includes performing maintenance and service on the aircraft, which may include performing maintenance and service on the feature extraction model 130, the trained autonomous agent 132, or both.

Each of the processes of the lifecycle 1100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Aspects of the disclosure can be described in the context of an example of a vehicle, such as a spacecraft or an aircraft. A particular example of a vehicle is an aircraft 1200 as shown in FIG. 12.

Figure 12:
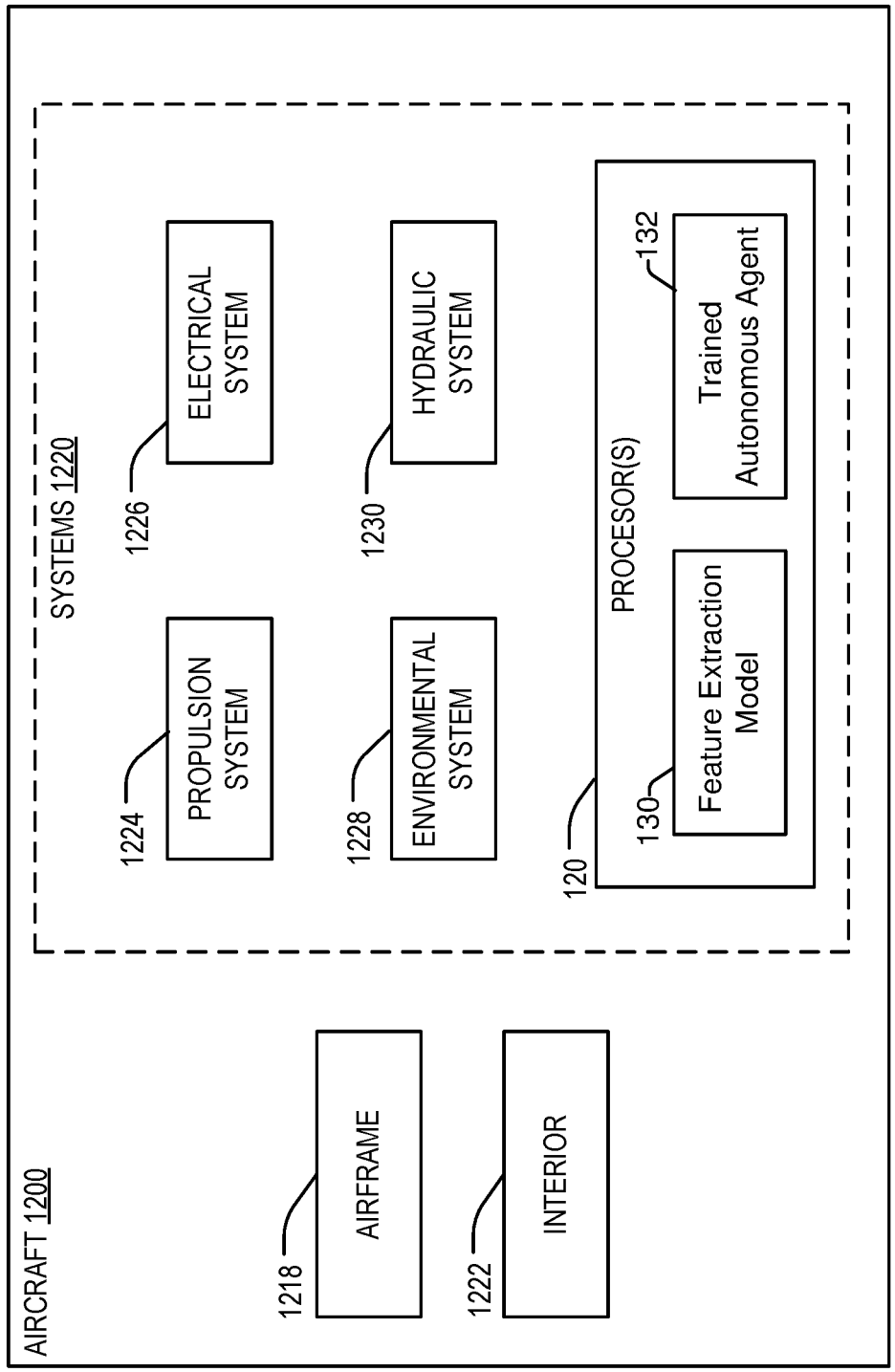
FIG. 12 is a block diagram an example of an aircraft configured to generate a proposed maneuver to mate a first connector with a second connector based on image data and position data.

In the example of FIG. 12, the aircraft 1200 includes an airframe 1218 with a plurality of systems 1220 and an interior 1222. Examples of the plurality of systems 1220 include one or more of a propulsion system 1224, an electrical system 1226, an environmental system 1228, and a hydraulic system 1230. Any number of other systems may be included. The systems 1220 of FIG. 12 also include the processor(s) 120, the feature extraction model 130, and the trained autonomous agent 132.

Figure 13:
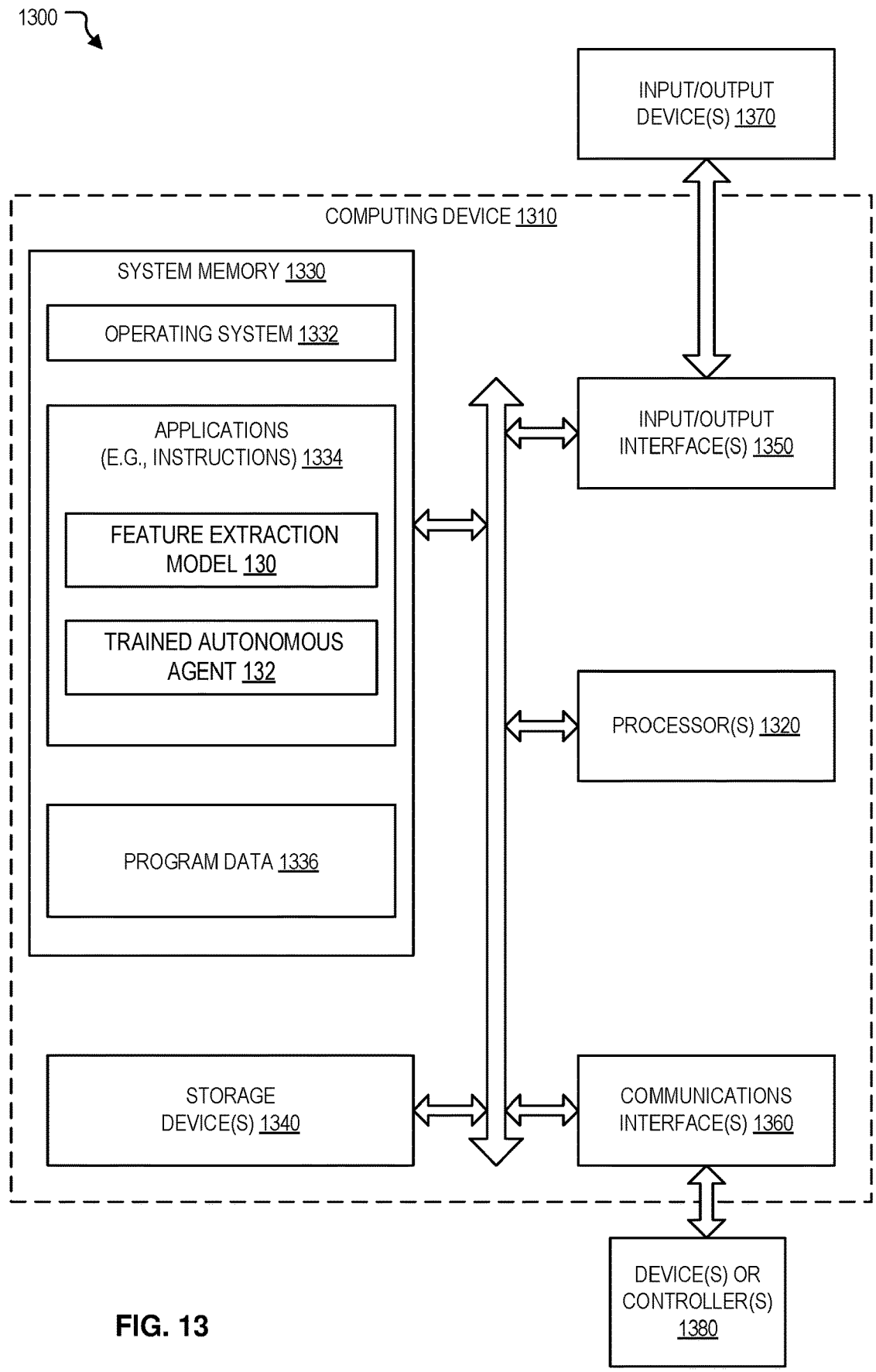
FIG. 13 is a block diagram of a computing environment including a computing device configured to support aspects of computer-implemented methods and computer-executable program instructions (or code) according to the present disclosure.

FIG. 13 is a block diagram of a computing environment 1300 including a computing device 1310 configured to support aspects of computer-implemented methods and computer-executable program instructions (or code) according to the present disclosure. For example, the computing device 1310, or portions thereof, is configured to execute instructions to initiate, perform, or control one or more operations described with reference to FIGS. 1-10.

The computing device 1310 includes one or more processors 1320. The processor(s) 1320 are configured to communicate with system memory 1330, one or more storage devices 1340, one or more input/output interfaces 1350, one or more communications interfaces 1360, or any combination thereof. In some implementations, the processor(s) 1320 correspond to, include, or are included within the image processor(s) 114 or the processor(s) 120 of FIG. 1.

The system memory 1330 includes volatile memory devices (e.g., random access memory (RAM) devices), nonvolatile memory devices (e.g., read-only memory (ROM) devices, programmable read-only memory, and flash memory), or both. The system memory 1330 stores an operating system 1332, which may include a basic input/output system for booting the computing device 1310 as well as a full operating system to enable the computing device 1310 to interact with users, other programs, and other devices. The system memory 1330 stores system (program) data 1336, such as data representing the known geometry 142 of FIG. 1.

The system memory 1330 includes one or more applications 1334 (e.g., sets of instructions) executable by the processor(s) 1320. As an example, the one or more applications 1334 include instructions executable by the processor(s) 1320 to initiate, control, or perform one or more operations described with reference to FIGS. 1-10. To illustrate, the one or more applications 1334 include instructions executable by the processor(s) 1320 to initiate, control, or perform one or more operations described with reference to the feature extraction model 130, the trained autonomous agent 132, or a combination thereof.

In a particular implementation, the system memory 1330 includes a non-transitory, computer readable medium storing the instructions that, when executed by the processor(s) 1320, cause the processor(s) 1320 to initiate, perform, or control operations to generate a proposed maneuver based on image data and position data. For example, the operations include providing a first image as input to a feature extraction model to generate feature data; obtaining position data indicating a position in three-dimensional space of a first connector of the first device; and providing the feature data and the position data as input to a trained autonomous agent to generate a proposed maneuver to mate a first connector with a second connector.

The one or more storage devices 1340 include nonvolatile storage devices, such as magnetic disks, optical disks, or flash memory devices. In a particular example, the storage devices 1340 include both removable and non-removable memory devices. The storage devices 1340 are configured to store an operating system, images of operating systems, applications (e.g., one or more of the applications 1334), and program data (e.g., the program data 1336). In a particular aspect, the system memory 1330, the storage devices 1340, or both, include tangible computer-readable media. In a particular aspect, one or more of the storage devices 1340 are external to the computing device 1310.

The one or more input/output interfaces 1350 enable the computing device 1310 to communicate with one or more input/output devices 1370 to facilitate user interaction. For example, the one or more input/output interfaces 1350 can include the GUI engine 150 of FIG. 1, a display interface, an input interface, or both. For example, the input/output interface 1350 is adapted to receive input from a user, to receive input from another computing device, or a combination thereof. In some implementations, the input/output interface 1350 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1370 includes one or more user interface devices and displays, including some combination of buttons, keyboards, pointing devices, displays, speakers, microphones, touch screens, and other devices.

The processor(s) 1320 are configured to communicate with devices or controllers 1380 via the one or more communications interfaces 1360. For example, the one or more communications interfaces 1360 can include a network interface. The devices or controllers 1380 can include, for example, the maneuvering system 144 of FIG. 1, one or more other devices, or any combination thereof.

In conjunction with the described systems and methods, an apparatus includes means for providing a first image as input to a feature extraction model to generate feature data. In some implementations, the means for providing a first image as input to a feature extraction model corresponds to the first device 102, the camera 122, the image processor(s) 114, the downsampler 134, the processor(s) 120, one or more other circuits or devices configured to provide an image as input to a feature extraction model, or a combination thereof.

The apparatus also includes means for obtaining position data indicating a position in three-dimensional space of a first connector of the first device. For example, the means for obtaining position data can correspond to the first device 102, the sensor(s) 124, the position encoders 126, the processor(s) 120, one or more other devices configured to obtain position data, or a combination thereof.

The apparatus also includes means for providing the feature data and the position data as input to a trained autonomous agent to generate a proposed maneuver to mate the first connector with a second connector of a second device. For example, the means for providing the feature data and the position data as input to a trained autonomous agent can correspond to the first device 102, the feature extraction model 130, the processor(s) 120, one or more other devices configured to provide the feature data and the position data as input to a trained autonomous agent, or a combination thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-10. In some implementations, part or all of one or more of the operations or methods of FIGS. 1-10 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Aspects of the disclosure are described further with reference to the following set of interrelated clauses:

Clause 1 includes a method including: providing a first image as input to a feature extraction model to generate feature data, wherein the first image depicts a first portion of a first device and a second portion of a second device, wherein the feature data includes first coordinates representing key points of the first device depicted in the first image and includes second coordinates representing key points of the second device depicted in the first image; obtaining, from one or more sensors onboard the first device, position data indicating a position in three-dimensional space of a first connector of the first device, wherein the first connector is disposed on the first portion of the first device; and providing the feature data and the position data as input to a trained autonomous agent to generate a proposed maneuver to mate the first connector with a second connector of the second device.

Clause 2 includes the method of Clause 1 wherein the first device includes a tanker aircraft, the first portion of the first device includes a refueling boom, the first connector includes a refueling connector of the refueling boom, the second device includes an aircraft, and the second connector includes a refueling receptacle of the aircraft.

Clause 3 includes the method of Clause 1 wherein the first device includes a first spacecraft, the first connector includes a first docking connector, the second device includes a second spacecraft, and the second connector includes a second docking connector.

Clause 4 includes the method of any of Clauses 1 to 3 wherein the position data indicates the position in a reference frame that is associated with the first device and is independent of the second device.

Clause 5 includes the method of any of Clauses 1 to 4 wherein the position data is generated based on output of one or more position encoders of associated with the first portion.

Clause 6 includes the method of any of Clauses 1 to 5 and further includes, before providing the first image as input to the feature extraction model, receiving a source image and downsampling the source image one or more times to generate the first image.

Clause 7 includes the method of any of Clauses 1 to 6 and further includes, before providing the first image as input to the feature extraction model: receiving a source image; downsampling the source image to generate a second image;

downsampling the second image to generate the first image; and providing the second image as input to the feature extraction model to generate the feature data.

Clause 8 includes the method of any of Clauses 1 to 7 and further includes generating a graphical user interface that includes a graphical element indicating the proposed maneuver.

Clause 9 includes the method of Clause 8 wherein the graphical user interface further includes the first image and the graphical element overlays at least a portion of the first image in the graphical user interface.

Clause 10 includes the method of any of Clauses 1 to 9 and further includes generating a maneuver limit output if a maneuver limit criterion is satisfied, wherein the maneuver limit output causes a limitation to be applied to at least one of: maneuvering operations that can be executed by the first device, maneuvering operations that can be executed by the first portion of the first device, or a set of maneuvers that can be selected as the proposed maneuver.

Clause 11 includes the method of any of Clauses 1 to 10 wherein the trained autonomous agent includes or corresponds to a neural network trained via a reinforcement learning process to determine maneuvering operations to mate the first connector and the second connector.

Clause 12 includes the method of any of Clauses 1 to 11 and further includes obtaining, from the one or more sensors onboard the first device, supplemental sensor data indicative of relative positions of the first device and the second device in three-dimensional space, wherein the supplemental sensor data includes one or more of range data, radar data, lidar data, sonar data, or stereoscopic image data.

Clause 13 includes the method of any of Clauses 1 to 12 wherein the first device includes an aircraft, and further including obtaining flight data from one or more of a flight control system or a flight instrument of the aircraft and providing the flight data and as input to the trained autonomous agent to generate the proposed maneuver.

Clause 14 includes the method of any of Clauses 1 to 13 wherein the first device includes an aircraft, and further including obtaining flight data from one or more of a flight control system or a flight instrument of the aircraft, and wherein the proposed maneuver is generated based on a determination that the flight data satisfies a screening criterion.

Clause 15 includes the method of any of Clauses 1 to 14 and further includes: providing the first image to a segmentation model to generate a segmentation map representing distinct regions of the first image; and providing the segmentation map as input to the feature extraction model to generate the feature data.

Clause 16 includes the method of any of Clauses 1 to 15 and further includes: performing a comparison of the second coordinates representing the key points of the second device to known geometry of the second device; and modifying the feature data based on the comparison.

Clause 17 includes the method of any of Clauses 1 to 16 and further includes: generating a reward value based on the proposed maneuver; and modifying a link weight of the trained autonomous agent based on the reward value.

Clause 18 includes the method of Clause 17 wherein the reward value is based, at least in part, on how closely the proposed maneuver matches a maneuver performed by a human operator.

Clause 19 includes the method of Clause 17 or Clause 18 wherein the reward value is based, at least in part, on a time required to mate the first connector and the second connector.

Clause 20 includes the method of any of Clauses 17 to 19 wherein the reward value is based, at least in part, on a whether the proposed maneuver results in the first connector contacting any portion of the second device other than the second connector.

Clause 21 includes the method of any of Clauses 1 to 20 and further includes commanding repositioning of the first portion of the first device based on the proposed maneuver.

Clause 22 includes a device including: a moveable coupling system configured to move a first connector relative to the second connector of a second device; one or more sensors configured to generate position data indicating a position in three-dimensional space of the first connector; a camera configured to generate image data depicting a portion of the moveable coupling system and at least a portion of the second device; a feature extraction model configured to receive a first image based on the image data and to generate feature data based on the first image, wherein the feature data includes first coordinates representing key points of the moveable coupling system depicted in the first image and includes second coordinates representing key points of the second device depicted in the first image; and a trained autonomous agent configured to generate, based on the feature data and the position data, a proposed maneuver to mate the first connector with a second connector of the second device.

Clause 23 includes the device of Clause 22 wherein the moveable coupling system includes a refueling boom of a tanker aircraft, the first connector includes a refueling connector of the refueling boom, the second device includes an aircraft, and the second connector includes a refueling receptacle of the aircraft.

Clause 24 includes the device of Clause 22, wherein the moveable coupling system includes a first docking connector of a first spacecraft, the second device includes a second spacecraft, and the second connector includes a second docking connector.

Clause 25 includes the device of any of Clauses 22 to 24 wherein the position data indicates the position in a reference frame that is associated with the device and is independent of the second device.

Clause 26 includes the device of any of Clauses 22 to 25 wherein the position data is generated based on output of one or more position encoders of associated with the moveable coupling system.

Clause 27 includes the device of any of Clauses 22 to 26 and further includes an image processor configured to receive a source image from the camera and to downsample the source image to generate the first image.

Clause 28 includes the device of any of Clauses 22 to 27 wherein the image processor is further configured to downsample the first image to generate a second image, and wherein the feature extraction model generates the feature data based on the first image and the second image.

Clause 29 includes the device of any of Clauses 22 to 28 and further includes a graphical user interface engine coupled to the trained autonomous agent and configured to output a graphical user interface that includes a graphical element indicating the proposed maneuver.

Clause 30 includes the device of Clause 29 wherein the graphical user interface further includes the first image and the graphical element overlays at least a portion of the first image in the graphical user interface.

Clause 31 includes the device of any of Clauses 22 to 30 and further includes a maneuver limiter configured to, based on a maneuver limit criterion being satisfied, causes a limitation to be applied to at least one of: maneuvering operations that can be executed by the device, maneuvering operations that can be executed by the steerable boom, or a set of maneuvers that can be selected as the proposed maneuver.

Clause 32 includes the device of any of Clauses 22 to 31 wherein the trained autonomous agent includes or corresponds to a neural network trained via a reinforcement learning process to determine maneuvering operations to mate the first connector and the second connector.

Clause 33 includes the device of any of Clauses 22 to 32 wherein the one or more sensors are further configured to generate supplemental sensor data indicative of relative positions of the device and the second device in three-dimensional space, wherein the supplemental sensor data includes one or more of range data, radar data, lidar data, sonar data, or stereoscopic image data.

Clause 34 includes the device of any of Clauses 22 to 33 and further includes at least one of a flight control system or a flight instrument configured to generate flight data and provide the flight data as input to the trained autonomous agent to generate the proposed maneuver.

Clause 35 includes the device of Clause 34, wherein the proposed maneuver is generated based on a determination that the flight data satisfies a screening criterion.

Clause 36 includes the device of any of Clauses 22 to 35 and further includes a segmentation model configured to generate a segmentation map representing distinct regions of the first image, wherein the feature extraction model is configured to generate the feature data based, at least in part, on the segmentation map.

Clause 37 includes the device of any of Clauses 22 to 36 and further includes a memory storing data representing a known geometry of the second device, wherein the feature extraction model is configured to generate the feature data based, at least in part, on the known geometry of the second device.

Clause 38 includes the device of any of Clauses 22 to 37 and further includes a control system configured to command repositioning of the moveable coupling system based on the proposed maneuver.

Clause 39 includes a tanker aircraft including: a steerable refueling boom including a refueling connector configured to couple to a refueling receptacle of a second aircraft during refueling of the second aircraft; one or more sensors coupled to the steerable refueling boom and configured to generate position data indicating a position of the steerable refueling boom in three-dimensional space; a camera configured to generate image data depicting a portion of the steerable refueling boom and at least a portion of the second aircraft; a feature extraction model configured to receive a first image based on the image data and to generate feature data based on the first image, wherein the feature data includes first coordinates representing key points of the steerable refueling boom depicted in the first image and includes second coordinates representing key points of the second aircraft depicted in the first image; and a trained autonomous agent configured to generate, based on the feature data and the position data, a proposed maneuver to mate the refueling connector with the refueling receptacle.

Clause 40 includes the tanker aircraft of Clause 39 wherein the position data indicates the position in a reference frame associated with the tanker aircraft and independent of the second aircraft.

Clause 41 includes the tanker aircraft of Clause 39 or Clause 40 wherein the one or more sensors include one or more position encoders associated with the steerable refueling boom, wherein the position data is generated based on output of the one or more position encoders.

Clause 42 includes the tanker aircraft of any of Clauses 39 to 41 and further includes an image processor configured to receive a source image from the camera and to downsample the source image to generate the first image.

Clause 43 includes the tanker aircraft of Clause 42 wherein the image processor is further configured to downsample the first image to generate a second image, and wherein the feature extraction model generates the feature data based on the first image and the second image.

Clause 44 includes the tanker aircraft of any of Clauses 39 to 43 and further includes a graphical user interface engine configured to output a graphical user interface that includes a graphical element indicating the proposed maneuver.

Clause 45 includes the tanker aircraft of Clause 44 wherein the graphical user interface further includes the first image and the graphical element overlays at least a portion of the first image in the graphical user interface.

Clause 46 includes the tanker aircraft of any of Clauses 39 to 45 and further includes a maneuver limiter configured to, based on a maneuver limit criterion being satisfied, cause a limitation to be applied to at least one of: maneuvering operations that can be executed by the tanker aircraft, maneuvering operations that can be executed by the steerable refueling boom, or a set of maneuvers that can be selected as the proposed maneuver.

Clause 47 includes the tanker aircraft of any of Clauses 39 to 46 wherein the trained autonomous agent includes or corresponds to a neural network trained via a reinforcement learning process to determine maneuvering operations to mate the refueling connector and the refueling receptacle.

Clause 48 includes the tanker aircraft of any of Clauses 39 to 47 wherein the one or more sensors are further configured to generate supplemental sensor data indicative of relative positions of the tanker aircraft and the second aircraft in three-dimensional space, wherein the supplemental sensor data includes one or more of range data, radar data, lidar data, sonar data, or stereoscopic image data.

Clause 49 includes the tanker aircraft of any of Clauses 39 to 48 and further includes at least one of a flight control system or a flight instrument configured to generate flight data and provide the flight data as input to the trained autonomous agent to generate the proposed maneuver.

Clause 50 includes the tanker aircraft of any of Clauses 39 to 49 and further includes a segmentation model configured to generate a segmentation map representing distinct regions of the first image, wherein the feature extraction model is configured to generate the feature data based, at least in part, on the segmentation map.

Clause 51 includes the tanker aircraft of any of Clauses 39 to 50 and further includes a memory storing data representing a known geometry of the second aircraft, wherein the feature extraction model is configured to generate the feature data based, at least in part, on the known geometry of the second aircraft.

Clause 52 includes the tanker aircraft of any of Clauses 39 to 51 and further includes a control system configured to command repositioning of the steerable refueling boom based on the proposed maneuver.

Clause 53 includes a spacecraft including: a steerable docking mechanism including a first docking connector configured to couple to a second docking connector of a second spacecraft during a docking operation; one or more sensors coupled to the steerable docking mechanism and configured to generate position data indicating a position of the steerable docking mechanism in three-dimensional space; a camera configured to generate image data depicting a portion of the steerable docking mechanism and at least a portion of the second spacecraft; a feature extraction model configured to receive a first image based on the image data and to generate feature data based on the first image, wherein the feature data includes first coordinates representing key points of the steerable docking mechanism depicted in the first image and includes second coordinates representing key points of the second spacecraft depicted in the first image; and a trained autonomous agent configured to generate, based on the feature data and the position data, a proposed maneuver to mate the first docking connector with the second docking connector.

Clause 54 includes the spacecraft of Clause 53 wherein the position data indicates the position in a reference frame associated with the spacecraft and independent of the second spacecraft.

Clause 55 includes the spacecraft of Clause 53 or Clause 54 wherein the one or more sensors include one or more position encoders associated with the steerable docking mechanism, wherein the position data is generated based on output of the one or more position encoders.

Clause 56 includes the spacecraft of any of Clauses 53 to 55 and further includes an image processor configured to receive a source image from the camera and to downsample the source image to generate the first image.

Clause 57 includes the spacecraft of Clause 56 wherein the image processor is further configured to downsample the first image to generate a second image, and wherein the feature extraction model generates the feature data based on the first image and the second image.

Clause 58 includes the spacecraft of any of Clauses 53 to 57 and further includes a graphical user interface engine configured to output a graphical user interface that includes a graphical element indicating the proposed maneuver.

Clause 59 includes the spacecraft of Clause 58 wherein the graphical user interface further includes the first image and the graphical element overlays at least a portion of the first image in the graphical user interface.

Clause 60 includes the spacecraft of any of Clauses 53 to 59 and further includes a maneuver limiter configured to, based on a maneuver limit criterion being satisfied, cause a limitation to be applied to at least one of: maneuvering operations that can be executed by the spacecraft, maneuvering operations that can be executed by the steerable docking mechanism, or a set of maneuvers that can be selected as the proposed maneuver.

Clause 61 includes the spacecraft of any of Clauses 53 to 60 wherein the trained autonomous agent includes or corresponds to a neural network trained via a reinforcement learning process to determine maneuvering operations to mate the first connector and the second connector.

Clause 62 includes the spacecraft of any of Clauses 53 to 61 wherein the one or more sensors are further configured to generate supplemental sensor data indicative of relative positions of the spacecraft and the second spacecraft in three-dimensional space, wherein the supplemental sensor data includes one or more of range data, radar data, lidar data, sonar data, or stereoscopic image data.

Clause 63 includes the spacecraft of any of Clauses 53 to 62 and further includes a segmentation model configured to generate a segmentation map representing distinct regions of the first image, wherein the feature extraction model is configured to generate the feature data based, at least in part, on the segmentation map.

Clause 64 includes the spacecraft of any of Clauses 53 to 63 and further includes a memory storing data representing a known geometry of the second spacecraft, wherein the feature extraction model is configured to generate the feature data based, at least in part, on the known geometry of the second spacecraft.

Clause 65 includes the spacecraft of any of Clauses 53 to 64 and further includes a control system configured to command repositioning of the steerable docking mechanism based on the proposed maneuver.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
    providing a first image as input to a feature extraction model to generate feature data, wherein the first image depicts a first portion of a first device and a second portion of a second device, wherein the feature data includes first coordinates representing key points of the first device depicted in the first image and includes second coordinates representing key points of the second device depicted in the first image;
    obtaining, from one or more sensors onboard the first device, position data indicating a position in three-dimensional space of a first connector of the first device, wherein the first connector is disposed on the first portion of the first device; and
    providing the feature data and the position data as input to a trained autonomous agent to maneuver to mate the first connector with a second connector of the second device.

2. The method of claim 1, wherein the first device includes a tanker aircraft, the first portion of the first device includes a refueling boom, the first connector includes a refueling connector of the refueling boom, the second device includes an aircraft, and the second connector includes a refueling receptacle of the aircraft.

3. The method of claim 1, wherein the first device includes a first spacecraft, the first connector includes a first docking connector, the second device includes a second spacecraft, and the second connector includes a second docking connector.

4. The method of claim 1, wherein the position data indicates the position in a reference frame that is associated with the first device and is independent of the second device.

5. The method of claim 1, further comprising, before providing the first image as input to the feature extraction model, receiving a source image and downsampling the source image one or more times to generate the first image.

6. The method of claim 1, further comprising:
providing the first image to a segmentation model to generate a segmentation map representing distinct regions of the first image; and
providing the segmentation map as input to the feature extraction model to generate the feature data.

7. The method of claim 1, further comprising:
performing a comparison of the second coordinates representing the key points of the second device to known geometry of the second device; and
modifying the feature data based on the comparison.

8. The method of claim 1, further comprising commanding repositioning of the first portion of the first device based on the proposed maneuver.

* * * * *